US012647531B1

(12) United States Patent
Chan et al.

(10) Patent No.: US 12,647,531 B1
(45) Date of Patent: Jun. 2, 2026

(54) PROTECTED DISPLAY OF SHARED VISUAL DATA ASSOCIATED WITH AN AUDIOVISUAL CONFERENCE SESSION

(71) Applicant: Wells Fargo Bank, N.A., San Francisco, CA (US)

(72) Inventors: Huanchee Aaron Chan, Fort Mill, SC (US); Carrie Anne Hanson, Charlotte, NC (US); Dawn Sasse, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 474 days.

(21) Appl. No.: 18/061,293

(22) Filed: Dec. 2, 2022

(51) Int. Cl.
| | |
|---|---|
| *H04L 65/403* | (2022.01) |
| *G06V 10/764* | (2022.01) |
| *H04L 9/40* | (2022.01) |
| *H04L 12/18* | (2006.01) |
| *H04L 65/401* | (2022.01) |
| *H04N 7/15* | (2006.01) |

(52) U.S. Cl.
CPC .......... *H04N 7/152* (2013.01); *G06V 10/764* (2022.01); *H04L 12/1822* (2013.01); *H04L 63/0428* (2013.01); *H04L 65/4015* (2013.01); *H04L 65/403* (2013.01)

(58) Field of Classification Search
CPC .... H04N 7/152; G06F 3/1454; G06V 10/764; G06V 30/10; H04L 12/1822
See application file for complete search history.

(56) References Cited

U.S. PATENT DOCUMENTS

| | | | |
|---|---|---|---|
| 7,685,234 | B2 | 3/2010 | Gottfried |
| 8,566,208 | B1 | 10/2013 | Cunningham et al. |
| 10,049,227 | B1 * | 8/2018 | Sampson ............ G06F 21/6218 |
| 10,684,738 | B1 | 6/2020 | Sicora et al. |
| 10,740,216 | B1 * | 8/2020 | Parent .................... G06N 20/00 |
| 10,747,894 | B1 * | 8/2020 | Cline ...................... G06F 40/35 |
| 11,006,077 | B1 * | 5/2021 | Truong ................... H04N 7/15 |
| 11,321,709 | B1 | 5/2022 | Kolchin |

(Continued)

OTHER PUBLICATIONS

Goldsteen, Abigail et al. Application-Screen Masking: A Hybrid Approach. IEEE Software, vol. 32, issue: 4. https://ieeexplore.ieee.org/stamp/stamp.jsptp= arnumber=7106392 (Year: 2015).

(Continued)

*Primary Examiner* — Quoc D Tran
(74) *Attorney, Agent, or Firm* — K&L Gates LLP

(57) ABSTRACT

System, apparatus, and computer program products are disclosed for protected display of a shared visual data object for an audiovisual conference session. In one aspect, a method includes receiving the shared visual data object, wherein the shared visual data object comprises visual data associated with one or more shared user interfaces; determining, using user interface generation circuitry and based on the shared visual data object, one or more protected data values associated with one or more protected data fields; generating, using the user interface generation circuitry, a masked visual data object based on each masked representation and each spatial coordinate set; and causing, using the user interface generation circuitry and/or the communications hardware, the masked visual data object to be displayed using the audiovisual conference session.

20 Claims, 13 Drawing Sheets

(56)                    References Cited

U.S. PATENT DOCUMENTS

| | | | |
|---|---|---|---|
| 11,544,362 | B2 | 1/2023 | Efremov |
| 11,546,661 | B2 | 1/2023 | Brannon |
| 11,714,683 | B1 | 8/2023 | Roberts |
| 2005/0138110 | A1 | 6/2005 | Redlich |
| 2011/0249905 | A1* | 10/2011 | Singh ................... G06V 30/412 |
| | | | 382/225 |
| 2018/0158489 | A1 | 6/2018 | Avedissian et al. |
| 2019/0266345 | A1 | 8/2019 | Jeong |
| 2020/0293685 | A1 | 9/2020 | Levay |
| 2020/0387995 | A1* | 12/2020 | Bucciarelli ............. H04W 4/14 |
| 2021/0099488 | A1* | 4/2021 | Schrager ................. H04L 63/20 |
| 2021/0303718 | A1* | 9/2021 | Singh ...................... G06F 21/84 |
| 2021/0344660 | A1* | 11/2021 | Benkreira ............... H04L 63/08 |
| 2022/0414241 | A1* | 12/2022 | Chittampally .......... G06F 21/84 |
| 2023/0059019 | A1* | 2/2023 | Asthana ............. H04L 65/4015 |
| 2023/0069524 | A1* | 3/2023 | Hüffner ................... G06F 21/50 |
| 2023/0229790 | A1 | 7/2023 | Mozer |
| 2023/0300114 | A1 | 9/2023 | Bhallamudi |
| 2023/0367534 | A1* | 11/2023 | Cui ....................... G06F 3/1454 |
| 2024/0089537 | A1* | 3/2024 | Shanmugam .... H04N 21/44008 |

OTHER PUBLICATIONS

Sultana, Habiba; Kamal, Ah M. An Edge Detection Based Reversible Data Hiding Scheme. 2022 IEEE Delhi Section Conference ( DELCON). https://ieeexplore.ieee.org/stamp/stamp.jsptp= arnumber= 9753404 (Year: 2022).

Ali, Osama; Ouda, Abdelkader. A classification module in data masking framework for Business Intelligence platform in healthcare. 2016 IEEE 7th Annual Information Technology, Electronics and Mobile Communication Conference (IEMCON). https:// ieeexplore. ieee.org/stamp/stamp.jsptp= arnumber=77 46327 (Year: 2016).

* cited by examiner

700

| Protected Data Fields | Data Masking Operation |
|---|---|
| Account Balance | Black box |
| Account Number | Synthetic data |

Receive a shared visual data object

1004

Generate a masked visual data object

1006

Display the masked visual data object

PROTECTED DISPLAY OF SHARED VISUAL DATA ASSOCIATED WITH AN AUDIOVISUAL CONFERENCE SESSION

TECHNOLOGICAL FIELD

Example embodiments of the present disclosure relate generally to data security techniques and, more particularly, to systems and methods for secure display of user interfaces.

BACKGROUND

Conventionally, user interfaces on a device (e.g., smartphone, desktop computer, laptop, tablet, etc.) display the entirety of a user's data, regardless of device viewership. As such, these conventional techniques for user interface generation fail to provide techniques for secure and flexible display of user interfaces that contain sensitive information, such as for secure and flexible display of user interfaces shared via an audiovisual conference session.

BRIEF SUMMARY

Users may interact with their client devices (e.g., smartphones, laptops, desktops, tablets, etc.) which are configured to display various user interfaces to the user. For example, a user may participate in an audiovisual conference session via an associated client device and may choose to share select content during the session. However, during this sharing session, the client device may operate according to normal operations such that it may receive and display information from other software applications (e.g., email notifications, message notifications, reminders, etc.) which may contain sensitive information. As such, it may be advantageous for a method of providing a protected display of visual data during an audiovisual conference session, thus preventing unnecessary exposure of a user's sensitive data during periods of shared user interface viewership.

Provided herein are techniques for protected display of visual data for an audiovisual conference session. The provided techniques enable secure and flexible display of visual data that contain sensitive information using masked visual data objects. As described below, in some embodiments, operations configured to generate masked visual data objects are performed on the server side, while in other embodiments operations configured to generate masked visual data objects are performed on the client side.

As further described below, a masked visual data object may be a visual data object that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures.

In some embodiments, when the client device of a sharing user transmits a shared visual data object to a server device, the server device first generates a masked visual data object and then transmits the masked visual data object to non-sharing client devices.

In some embodiments, in a peer-to-peer implementation, a sharing client device generates a masked visual data object and transmits the masked visual data object to non-sharing client devices. In some embodiments, in a peer-to-peer implementation, a sharing client device transmits the shared visual data object to non-sharing client devices, each non-sharing client device then generates a masked visual data object based on the shared visual data object and then displays data associated with the masked visual data object.

As these exemplary implementations indicate, in implementations where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

In one example embodiment, a method is provided for protected display of a shared visual data object for an audiovisual conference session. The method includes: (i) receiving, using communications hardware, the shared visual data object, wherein the shared visual data object comprises visual data associated with one or more shared user interfaces; (ii) determining, using user interface generation circuitry and based on the shared visual data object, one or more protected data values associated with one or more protected data fields, wherein determining the one or more protected data values comprises: (a) identifying one or more shared software applications, (b) for each shared software application, determining an application-specific protected data value set based on a data protection template for the shared software application, and (c) determining the one or more protected data values based on each application-specific protected data value set; (d) for each protected data value: (1) determining, using the user interface generation circuitry, a masked representation by applying a data masking operation for the protected data field that is associated with the protected data value to the protected data value, and (2) determining, based on a layout data object for the shared visual data object, spatial coordinate set for the protected data value; (iii) generating, using the user interface generation circuitry, a masked visual data object based on each masked representation and each spatial coordinate set; and (iv) causing, using the user interface generation circuitry and/or the communications hardware, the masked visual data object to be displayed using the audiovisual conference session.

In another example embodiment, an apparatus is provided for protected display of a shared visual data object for an audiovisual conference session. The apparatus includes communications hardware configured to: (i) receive, using communications hardware, the shared visual data object, wherein the shared visual data object comprises visual data associated with one or more shared user interfaces; (ii) determine, using user interface generation circuitry and based on the shared visual data object, one or more protected data values associated with one or more protected data fields, wherein determining the one or more protected data values comprises: (a) identifying one or more shared software applications, (b) for each shared software application, determining an application-specific protected data value set based on a data protection template for the shared software application, and (c) determining the one or more protected data values based on each application-specific protected data value set; (d) for each protected data value: (1) determining, using the user interface generation circuitry, a masked representation by applying a data masking operation for the protected data field that is associated with the protected data value to the protected data value, and (2) determining, based on a layout data object for the shared visual data object, spatial coordinate set for the protected data value; (iii) generate, using the user interface generation circuitry, a masked visual data object based on each masked representation and each spatial coordinate set; and (iv) cause, using the user interface generation circuitry and/or the communications hardware, the masked visual data object to be displayed using the audiovisual conference session.

In another example embodiment, a computer program product is provided for protected display of a shared visual data object for an audiovisual conference session. The computer program product includes at least one non-transitory computer-readable storage medium storing software instructions that, when executed, cause an apparatus to: (i) receive, using communications hardware, the shared visual data object, wherein the shared visual data object comprises visual data associated with one or more shared user interfaces; (ii) determine, using user interface generation circuitry and based on the shared visual data object, one or more protected data values associated with one or more protected data fields, wherein determining the one or more protected data values comprises: (a) identifying one or more shared software applications. (b) for each shared software application, determining an application-specific protected data value set based on a data protection template for the shared software application, and (c) determining the one or more protected data values based on each application-specific protected data value set; (d) for each protected data value: (1) determining, using the user interface generation circuitry, a masked representation by applying a data masking operation for the protected data field that is associated with the protected data value to the protected data value, and (2) determining, based on a layout data object for the shared visual data object, spatial coordinate set for the protected data value; (iii) generate, using the user interface generation circuitry, a masked visual data object based on each masked representation and each spatial coordinate set; and (iv) cause, using the user interface generation circuitry and/or the communications hardware, the masked visual data object to be displayed using the audiovisual conference session.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

FIG. 7 provides an operational example of a data protection template, in accordance with some example embodiments described herein.

DETAILED DESCRIPTION

Figure 1:
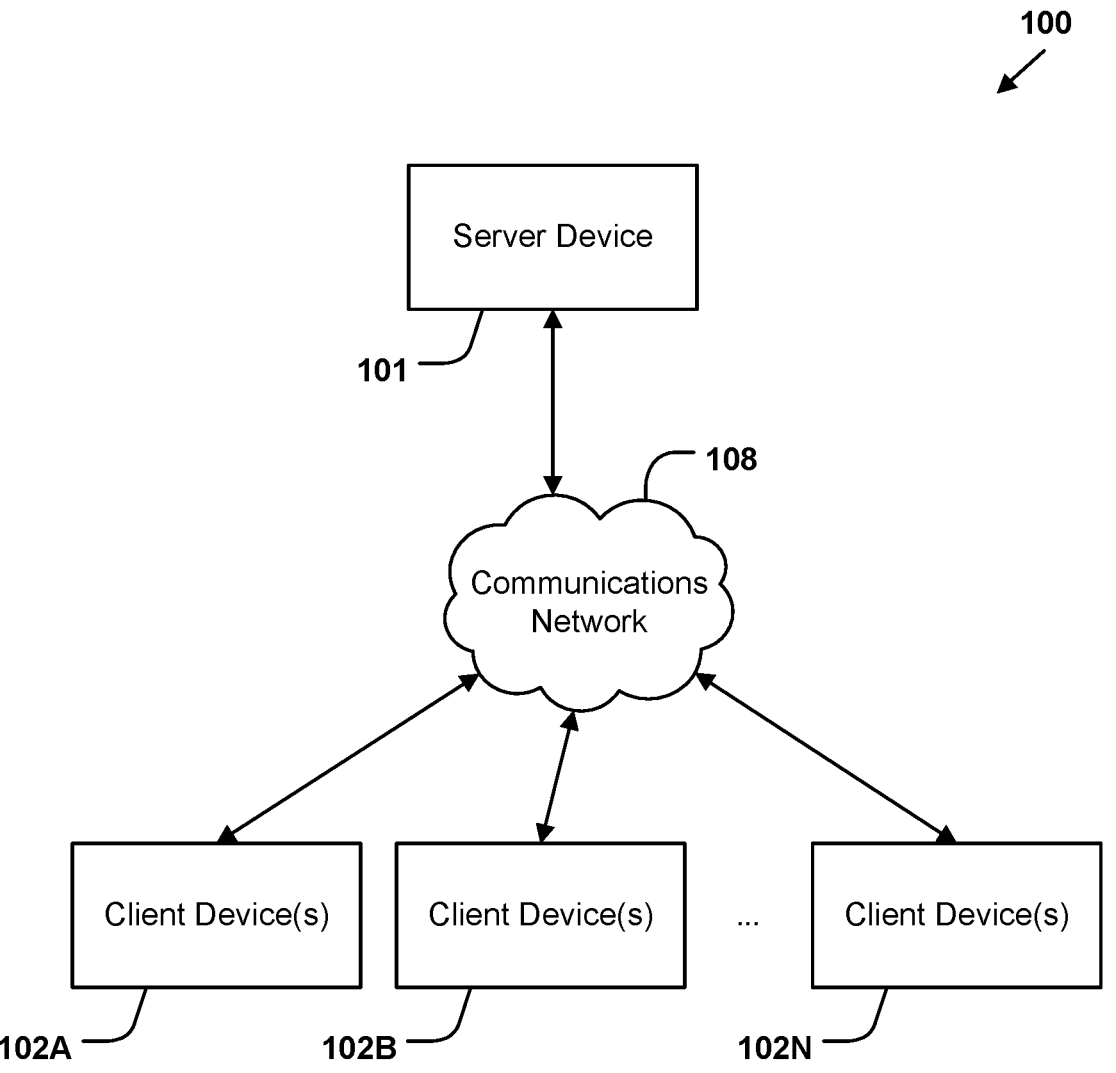
FIG. 1 illustrates a system in which some example embodiments may be used generating a verification non-fungible token, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "computer-readable medium" may refer to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "audiovisual conference session" may refer to a network-facilitated connection between two or more client devices that is used to transmit audiovisual data. In some embodiments, an audiovisual conference session is facilitated by a server device that is configured to receive communication packets from each client device that participates in the audiovisual conference session and transmit the communication packets to other client devices that participate in the audiovisual conference session. In some embodiments, an audiovisual conference session is facilitated by a peer-to-peer connection between the client devices participating in the audiovisual conference session, such that each client devices transmits communication packets directly to other client devices that participate in the audiovisual conference session. In some embodiments, the audiovisual conference session enables a participating user to share one or more user interfaces that are currently being displayed by the client device being used by the participating user with other users participating in the audiovisual conference session. In some of the noted embodiments, once a participating user selects to share one or more user interfaces with other participants in the audiovisual conference session, one or more packets containing the visual data associated with the shared user interfaces are transmitted (e.g., directly, indirectly via forwarding by an intermediate server device, and/or the like) by a client device being used by the sharing user to other client devices used by other participants of the audiovisual conference session.

The term "shared visual data object" may refer to a data construct that contains visual data associated with one or more screen captures of one or more shared user interfaces being concurrently displayed as part of an audiovisual conference session. In some embodiments, a shared visual data object contains visual data associated with one time unit (e.g., one second, one millisecond, and/or the like) of screen captures associated with one or more concurrently-shared user interfaces. In some embodiments, a shared visual data object contains visual data associated with a defined number of consecutive time units of screen captures associated with one or more concurrently-shared user interfaces. In some embodiments, given a sequence of shared visual data objects that are sequentially transmitted by the same client device during the same audiovisual conference session and without the termination of the screen/interface sharing session: (i) the first shared visual data object in the sequence contains visual data associated with one or more screen captures of one or more shared user interfaces being concurrently displayed as part of an audiovisual conference session, and (ii) each subsequent shared visual data object contains data describing the difference between the particular shared visual data object and an immediately preceding shared visual data object in the sequence. In this way, small differences between consecutive shared visual data objects (e.g., a difference in a cursor location) may be represented by smaller "diff" files rather than by files than contain entireties of screen capture visual datasets, thus reducing network resource needs of facilitating an audiovisual conference session between two or more participating users using two or more client devices.

The term "masked visual data object" may refer to a data construct that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures. In some embodiments, when the client device of a sharing user transmits a shared visual data object to a server device, the server device first generates a masked visual data object and then transmits the masked visual data object to non-sharing client devices. In some embodiments, in a peer-to-peer implementation, a sharing client device generates a masked visual data object and transmits the masked visual data object to non-sharing client devices. In some embodiments, in a peer-to-peer implementation, a sharing client device transmits the shared visual data object to non-sharing client devices, each non-sharing client device then generates a masked visual data object based on the shared visual data object and then displays data associated with the masked visual data object. As these exemplary implementations indicate, in implementations where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

The term "shared software application" may refer to a software application that is detected to be associated with at least one user interface whose screen captures are being displayed via the display data of a shared visual data object. For example, consider an exemplary embodiment in which a sharing user is sharing a screen that includes a portion of a user interface for a portable document format (PDF) document and a portion of a user interface for an email management software application. In this example, the shared software applications include the PDF display/management software application and the email management software application. In some embodiments, a client software application that facilitates user participation in an audiovisual conference session may enable the user to share either an entire screen or an entire user interface. In these embodiments, if the user chooses to share only a user interface and not an entire screen, then the resulting shared visual data object is associated with only one shared software application. As described above, in some embodiments, a shared software application is detected based on data reported by an operating system application programming interface (API) for an operating system of the sharing client device. In some embodiments, the operating system API is associated with API calls that are configured to report which software applications are being displayed by which screens of the sharing client device. Such reporting data may be obtained by the sharing client device or by another device that is configured to use them to detect the shared software applications associated with a shared visual data object and then generate a masked visual data object based on the detected shared software applications. In some embodiments, when a sharing client device is sharing a particular user interface instead of a screen in its entirety, metadata about the shared software application that is associated with the shared user interface is captured by the sharing client device based on user selection of the user interface. In some of the noted embodiments, the shared software application associated with the shared user interface is detected based on the noted metadata. In some embodiments, a shared software application is detected by analyzing a content layout data object associated with the shared visual data object.

The term "content layout data object" may refer to a data construct that describes content segments associated with a shared visual data object as well as spatial positioning of the noted content segments with respect to each other. In some embodiments, the content layout data object is obtained by performing one or more optical character recognition operations on the visual data associated with the shared visual data object. In some embodiments, once generated, the content layout data object is used to: (i) detect one or more shared user interfaces depicted by the shared visual data object, and (ii) for each shared user interface, a predicted share software application. For example, in some embodiments, the content layout data object is first used to generate one or more content segment units (e.g., text tokens or phrases for text segments). Then, a vector representation is generated for each content segment unit, where the vector representation may be generated based on both the content data for the content segment (e.g., a Word2Vec representation for a text segment unit, a convolutional representation for a pictorial segment unit, and/or the like) and the spatial coordinate set for the content segment. In some embodiments, once generated, the vector representations of content segment units are used by a clustering routine to determine one or more clusters of content segment units. Then, the visual data for the shared visual data object may be divided into one or more visual portions, where each visual portion is a contiguous portion of the visual data depicted by the shared visual data object that corresponds to a segment unit cluster and is generated in a manner that is configured to maximize the total number of segment units covered by the visual portions across all segment unit clusters. Once generated, each visual portion of the visual data depicted by the shared visual data object may be designated as the image representation of a shared user interface and provided to an image classification machine learning model that is configured to predict a respective software application for the image classification machine learning model from a schema of candidate software applications (e.g., a schema defined by software applications that are currently operating on a sharing client device as reported by the operating system API of the sharing client device, a schema defined by all of the software applications that may be deployed on sharing client devices in an intranet comprising the sharing client device, and/or the like).

The term "data protection template" may refer to a data construct that describes which data fields that may be protected by a software application are designated as protected data fields. For example, the data protection template for an email management software application may describe that email sender field, email recipient fields, email subject field, and email body field are designated as protected data fields that should be masked when generating a masked visual data object for a shared user interface that is associated with the email management software application. In some embodiments, a data protection template describes which data fields of a software application are protected data fields and a respective masking operation for each protection data field. For example, the data protection template for an email management software application may describe that: (i) email sender field is a protected data field, (ii) email sender values in a shared user interface associated with the email management software application should be replaced with a randomly-generated email server value, (iii) the email body field is a protected data field, and (iv) email body values in a shared user interface associated with the email management software application should be replaced with a masking user interface element. A masking user interface element may visually obscure the email body values in any suitable fashion, such as by using a black box user interface element that covers the entirety of the depicted portion of an email body value in a shared user interface for the email management software application or a blurred user interface element that blurs the entirety of the depicted portion of an email body value in a shared user interface for the email management software application. As the above-described examples illustrate, the same data field may be a protected data field in accordance with the data protection template of a first software application and an unprotected data field in accordance with the data protection template of a second software application. In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object.

The term "protected data value" may refer to a data construct that describes a data value that is depicted by a user interface and is associated with a protected data field of the user interface as described by the data protection template for the software application corresponding to user interface. In some embodiments, each user interface is configured to depict a set of data values for a set of data fields, where each data value is the value depicted by the user interface for a respective data field. For example, an account information user interface may be configured to depict an account balance data value for an account balance data field and an account number data value for an account number data field. In some embodiments, when a data value is associated with a protected data field, the data value is designated as being a protected data value, while a data value that is associated with an unprotected data field is designated as being an unprotected data value. For example, when the data protection template for the software application associated with an account information user interface may describe that the account balance data field is a protected data field while the account number data field is an unprotected data field, then the account balance data value that is depicted by the account information user interface may be designated as being a protected data value, while the account number data value that is depicted by the account information user interface may be designated as being an unprotected data value.

The term "application-specific protected data field set" may refer to a data construct that describes a set of protected data fields whose data values are being depicted by the visual data associated with a shared visual data object. For example, the data protection template for an email management software application may describe that email sender field, email recipient fields, email subject field, and email body field are designated as protected data fields that should be masked when generating a masked visual data object for a shared user interface that is associated with the email management software application. In this example, if the email sender field, the email recipient fields, and the email subject field of an email are being depicted by a shared user interface for the email management software application whose visual data are described by the shared visual data object, then the application-specific data field set for the email management software application include the email sender field, the email recipient fields, and the email subject field.

The term "application-specific protected data value set" may refer to a data construct that describes the data values depicted by the shared user interface for a shared software application that are associated with the application-specific protected data field set for the shared software application. For example, the application-specific data field set for the email management software application include the email sender field, the email recipient fields, and the email subject field, then the application-specific protected data value set for the email management software application include the email sender value depicted by a shared user interface that is associated with the email management software application, the email recipient list value depicted by a shared user interface that is associated with the email management software application, and the email subject value depicted by a shared user interface that is associated with the email management software application.

The term "spatial coordinate set" may refer to a data construct that describes one or more coordinate pairs for a respective data value, where each coordinate pair includes a horizontal coordinate value and a vertical coordinate value. In some embodiments, visual data for a shared visual data object is used to generate a two-dimensional coordinate system with a vertical coordinate and a horizontal coordinate system. In some of the noted embodiments, when a content segment unit corresponding to a data value is detected within the content layout data object for the shared visual data object, the location of the content segment unit within the visual data for the shared visual data object as determined based on the location of the content segment unit within the layout depicted by the content layout data object is mapped to one or more points in the coordinate system. For example, in some embodiments, the location of the content segment unit may be mapped to a point in the coordinate system that corresponds to a centroid location for the content segment unit. As another example, in some embodiments, the location of the content segment unit may be mapped to four points in the coordinate system that correspond to corner points of a bounding box including the content segment unit. In some embodiments, once the location of a content segment unit for a data value is mapped to one or more coordinate system points, the coordinates of those coordinate points are used to describe the spatial coordinate set for the data value. While various embodiments of the present invention describe generating coordinates for points within a two-dimensional plane using a rectangular/Cartesian coordinate system, a person of ordinary skill in the relevant technology will recognize that other coordinate systems such as the polar coordinate system may be used. In general, a spatial coordinate set for a data value may describe coordinate values for one or more points associated with the location of the data value within a two-dimensional plane associated with a shared visual data object that depicts the data value using its visual data.

The term "masked representation" may refer to a data construct that describes a visual and/or data representation of a corresponding data value that does not describe the corresponding data value and/or cannot be used to detect what the corresponding data value is. In some embodiments, the masked representation for a respective protected data value comprises a mask user interface element, such a mask user interface element that depicts the user interface region associated with the respective protected value as a redacted region. In some embodiments, the masked representation for a respective protected data value comprises a masked data value that is different from the respective protected data value. In some embodiments, the masked data value is a randomly-generated data value. In some embodiments, the randomly-generated data value is determined based on a probability distribution whose parameters (e.g., whose mean and/or standard deviation) are determined based on the respective protected data value. In some embodiments, a masked representation is generated by applying a data masking operation to a protected data value, where the data masking operation for the protected data value may be defined by a data protection template for a shared software application that is associated with the protected data value. In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object. For example, the data protection template for an online banking client-side software application may require that account balance values be replaced by a randomly-generated account balance value as part of generating a masked visual data object, while the data protection template for an email management software application may require that account balance data values be replaced by a black-box masking user interface element as part of generating a masked visual data object. In this example, a shared user interface for an online banking client-side software application may include a randomly-generated account balance value, while a shared user interface for an email management software application may include a black box user interface element that covers an area of the screen that depicts an account balance value reported by the email management software application.

Overview

Users may interact with their client devices (e.g., smartphones, laptops, desktops, tablets, etc.) which are configured to display various user interfaces to the user. For example, a user may participate in an audiovisual conference session via an associated client device and may choose to share select content during the session. However, during this sharing session, the client device may operate according to normal operations such that it may receive and display information from other software applications (e.g., email notifications, message notifications, reminders, etc.) which may contain sensitive information. As such, it may be advantageous for a method of providing a protected display of visual data during an audiovisual conference session, thus preventing unnecessary exposure of a user's sensitive data during periods of shared user interface viewership.

Provided herein are techniques for protected display of visual data associated with an audiovisual conference session. The provided techniques enable secure and flexible display of shared visual data objects that contain sensitive information using masked visual data objects that are generated using data protection templates that are specific to software applications whose data is being shared. By providing techniques for protected sharing of data during audiovisual conference sessions based on application-specific data protection templates, various embodiments of the present invention enable securing data sharing in audiovisual conference sessions in a manner that is flexible and responsive to cross-application distinctions.

In some embodiments, to enable protected display of a shared visual data object associated with an audiovisual conference data object, the following operations are performed: (i) receiving, using communications hardware, the shared visual data object, wherein the shared visual data object comprises visual data associated with one or more shared user interfaces; (ii) determining, using user interface generation circuitry and based on the shared visual data object, one or more protected data values associated with one or more protected data fields, wherein determining the one or more protected data values comprises: (a) identifying one or more shared software applications, (b) for each shared software application, determining an application-specific protected data value set based on a data protection template for the shared software application, and (c) determining the one or more protected data values based on each application-specific protected data value set; (d) for each protected data value: (1) determining, using the user interface generation circuitry, a masked representation by applying a data masking operation for the protected data field that is associated with the protected data value to the protected data value, and (2) determining, based on a layout data object for the shared visual data object, spatial coordinate set for the protected data value; (iii) generating, using the user interface generation circuitry, a masked visual data object based on each masked representation and each spatial coordinate set; and (iv) causing, using the user interface generation circuitry and/or the communications hardware, the masked visual data object to be displayed using the audiovisual conference session.

In some embodiments, a data protection template describes which data fields that may be protected by a software application are designated as protected data fields. For example, the data protection template for an email management software application may describe that email sender field, email recipient fields, email subject field, and email body field are designated as protected data fields that should be masked when generating a masked visual data object for a shared user interface that is associated with the email management software application. In some embodiments, a data protection template describes which data fields of a software application are protected data fields and a respective masking operation for each protection data field. For example, the data protection template for an email management software application may describe that: (i) email sender field is a protected data field, (ii) email sender values in a shared user interface associated with the email management software application should be replaced with a randomly-generated email server value, (iii) the email body field is a protected data field, and (iv) email body values in a shared user interface associated with the email management software application should be replaced with a masking user interface element. A masking user interface element may visually obscure the email body values in any suitable fashion, such as by using a black box user interface element that covers the entirety of the depicted portion of an email body value in a shared user interface for the email management software application or a blurred user interface element that blurs the entirety of the depicted portion of an email body value in a shared user interface for the email management software application.

As the above-described examples illustrate, the same data field may be a protected data field in accordance with the data protection template of a first software application and an unprotected data field in accordance with the data protection template of a second software application. When this scenario occurs, a data value corresponding to the data field that is depicted using a shared user interface for the first software application is replaced with a masked representation as part of generating a masked visual data object, while a data value corresponding to the data field that is depicted using a shared user interface for the second software application is not replaced with a masked representation as part of generating a masked visual data object. For example, an account balance field may be a protected data field in accordance with the data protection template of an online banking client-side software application but an unprotected data field in accordance with the data protection template of an email management software application. In this example, a shared user interface for an online banking client-side software application may include a masked representation of an account balance value, while a shared user interface for an online banking client-side software application may include an account balance value.

In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object. For example, the data protection template for an online banking client-side software application may require that account balance values be replaced by a randomly-generated account balance value as part of generating a masked visual data object, while the data protection template for an email management software application may require that account balance data values be replaced by a black-box masking user interface element as part of generating a masked visual data object. In this example, a shared user interface for an online banking client-side software application may include a randomly-generated account balance value, while a shared user interface for an email management software application may include a black box user interface element that covers an area of the screen that depicts an account balance value reported by the email management software application.

There are many technical advantages associated with the techniques provided herein for secure display of requested user interfaces. For example, various embodiments of the present invention enable a protection mode that, when enabled, causes shared user interfaces to be presented in a masked format and with the protected data values of those user interfaces replaced with masked representations. By enabling masked user interfaces that contain masked representations of protected data values instead of actual values of those protected data values, various embodiments of the present invention enhance data security of user interface platforms that are used to facilitate and enable audiovisual conference sessions.

As another example, when operations configured to generate masked visual data objects are performed on the server-side, a masked visual data object that excludes protected data values may be transmitted to a client device, instead of transmitting a visual data object that includes protected data values. By transmitting a generate masked visual data object that excludes protected data values may be transmitted to a client device instead of a visual data object that includes protected data values, various embodiments of the present invention enhance network transmission security and reliability of client-server networks that are used to transmit visual data objects from server devices to client devices.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As depicted in FIG. 1, the environment includes a server device 101 and one or more client devices 102A-102N. Server device 101 and the one or more client devices 102A-102N may receive and/or transmit information via communications network 108 (e.g., the Internet).

In some embodiments, the server device 101 is configured to receive shared visual data objects from client devices 102A-102N, generate masked visual data objects based on the shared visual data objects, and provide the masked visual data objects to the client devices. Accordingly, in some of these embodiments, the operations configured to generate masked visual data objects are done on the server side. In some embodiments, the server device 101 is merely configured to provide shared visual data objects to client devices 102A-102N. In response to receiving a shared visual data object, a client device may be configured to generate a masked visual data object and display the masked visual data object using a display device of the client device. Accordingly, in some of these embodiments, the operations configured to generate masked user interfaces are done on the client device.

The server device 101 may be configured to generate masked visual data objects and provide the masked visual data objects to client devices. The client device 102A-102N may be configured to display masked visual data objects using the display device of the client device. The client device and the server device may be configured to communicate over the communications network 108.

In some embodiments, an audiovisual conference session is facilitated by a peer-to-peer connection between the client devices 102A-102N participating in the audiovisual conference session, such that each client devices transmits communication packets directly to other client devices that participate in the audiovisual conference session. In some embodiments, the audiovisual conference session enables a participating user to share one or more user interfaces that are currently being displayed by the client device being used by the participating user with other users participating in the audiovisual conference session. In some of the noted embodiments, once a participating user selects to share one or more user interfaces with other participants in the audiovisual conference session, one or more packets containing the visual data associated with the shared user interfaces are transmitted (e.g., directly, indirectly via forwarding by an intermediate server device, and/or the like) by a client device being used by the sharing user to other client devices used by other participants of the audiovisual conference session.

In some embodiments, in a peer-to-peer implementation, a sharing client device generates a masked visual data object and transmits the masked visual data object to non-sharing client devices. In some embodiments, in a peer-to-peer implementation, a sharing client device transmits the shared visual data object to non-sharing client devices, each non-sharing client device then generates a masked visual data object based on the shared visual data object and then displays data associated with the masked visual data object. As these exemplary implementations indicate, in implementations where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

Example Server Device

Figure 2:
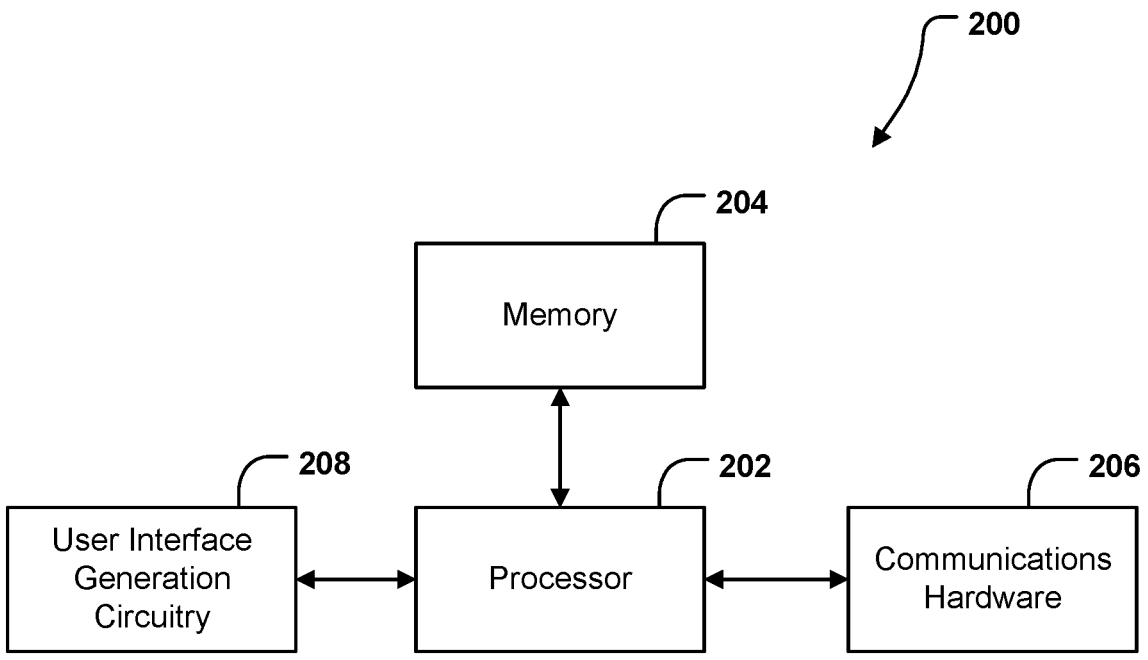
FIG. 2 illustrates a block diagram of example circuitry embodying a server device that may perform various operations in accordance with some example embodiments described herein.

The server device 101 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, and user interface generation circuitry 208, each of which will be described in greater detail below. While the various components are only illustrated in FIG. 2 as being connected with apparatus 200, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection FIGS. 4-11C.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. The communications hardware 206 comprise a user interface, such as a display, and may further comprise the components that govern use of the user interface, such as a web browser, mobile application, dedicated user device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 optionally comprises a user interface generation circuitry 208 that is configured to generate a masked visual data object. In some embodiments (e.g., in those embodiments in which masked visual data objects are generated using server-side operations), the user interface generation circuitry 208 is configured to generate masked visual data objects that are then provided to a client device using the communications hardware 206 for display by the client device.

Example Client Device

Figure 3:
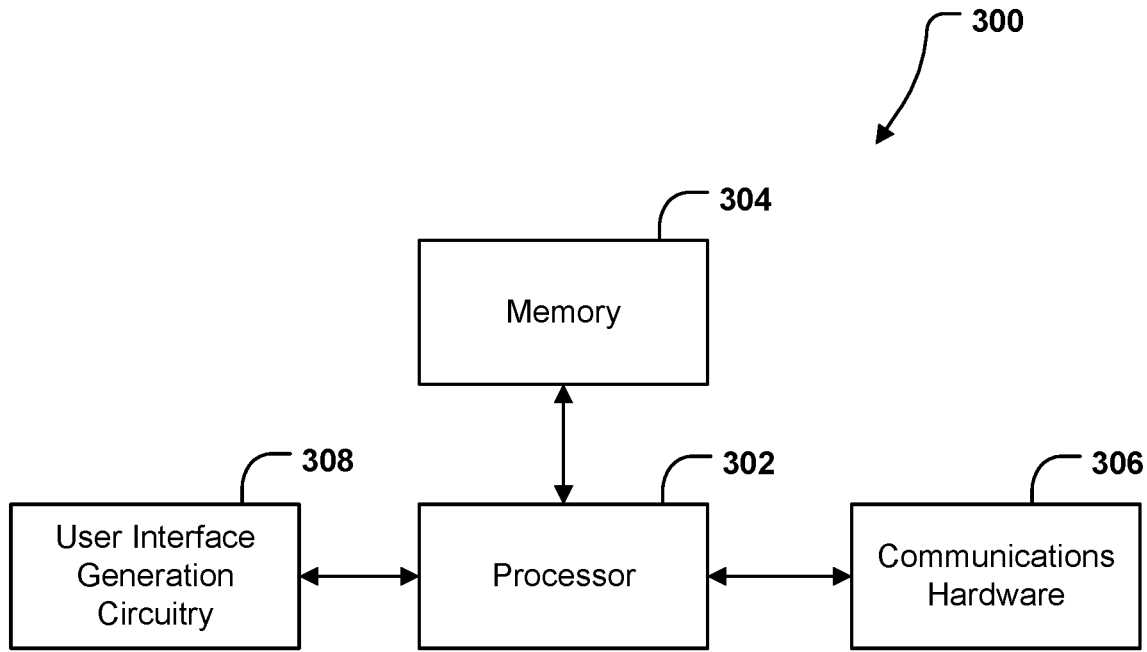
FIG. 3 illustrates a schematic block diagram of example circuitry embodying a client device that may perform various operations in accordance with some example embodiments described herein.

As illustrated in FIG. 3, an apparatus 300 is shown that represents a client device of any one of client devices 102A-102N. As illustrated in FIG. 3, the apparatus 300 may include processor 302, memory 304, communications hardware 306, and user interface generation circuitry 308, each of which will be described in greater detail below. While the various components are only illustrated in FIG. 3 as being connected with apparatus 300, it will be understood that the apparatus 300 may further comprise a bus (not expressly shown in FIG. 3) for passing information amongst any combination of the various components of the apparatus 300. The apparatus 300 may be configured to execute various operations described above in connection with FIG. 1 and below in connection FIGS. 4-11C.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device). In some cases, the processor may be configured to execute hard-coded functionality. As such, whether configured by hardware or software methods, or by a combination of hardware with software, the processor 302 represents an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

The memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processing circuitry for causing transmission of such signals to a network or for handling receipt of signals received from a network.

The communications hardware 306 may be configured to provide output to a user and, in some embodiments, to receive an indication of user input. The communications hardware 306 comprise a user interface, such as a display, and may further comprise the components that govern use of the user interface, such as a web browser, mobile application, dedicated user device, or the like. In some embodiments, the communications hardware 306 may include a keyboard, a mouse, a touch screen, touch areas, soft keys, a microphone, a speaker, and/or other input/output mechanisms. The communications hardware 306 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises a user interface generation circuitry 308 that is configured to either generate masked visual data objects and display those masked visual data objects, or alternatively to generate masked visual data objects and transmit those masked visual data objects. In some embodiments, (e.g., in those embodiments in which masked user interfaces are generated using client-side operations by a non-sharing client device), the user interface generation circuitry 308 is configured to generate a masked visual data object and then display the masked visual data object. In some embodiments, (e.g., in those embodiments in which masked user interfaces are generated using client-side operations by a sharing client device), the user interface generation circuitry 308 is configured to generate a masked visual data object and then transmit the masked visual data object.

In some embodiments, various components of the apparatus 200 and apparatus 300 may be hosted remotely (e.g., by one or more cloud servers) and thus need not physically reside on the corresponding apparatus 200 or apparatus 300. Thus, some or all of the functionality described herein may be provided by third party circuitry. For example, a given apparatus 200 or apparatus 300 may access one or more third party circuitries via any sort of networked connection that facilitates transmission of data and electronic information between the apparatus 200 or apparatus 300 and the third party circuitries. In turn, that apparatus 200 or apparatus 300 may be in remote communication with one or more of the other components described above as comprising the apparatus 200 or apparatus 300.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatus 200 and example apparatus 200, example embodiments are described below in connection with a series of diagrams and flowcharts.

Example Server-Side Operations

Figure 4:
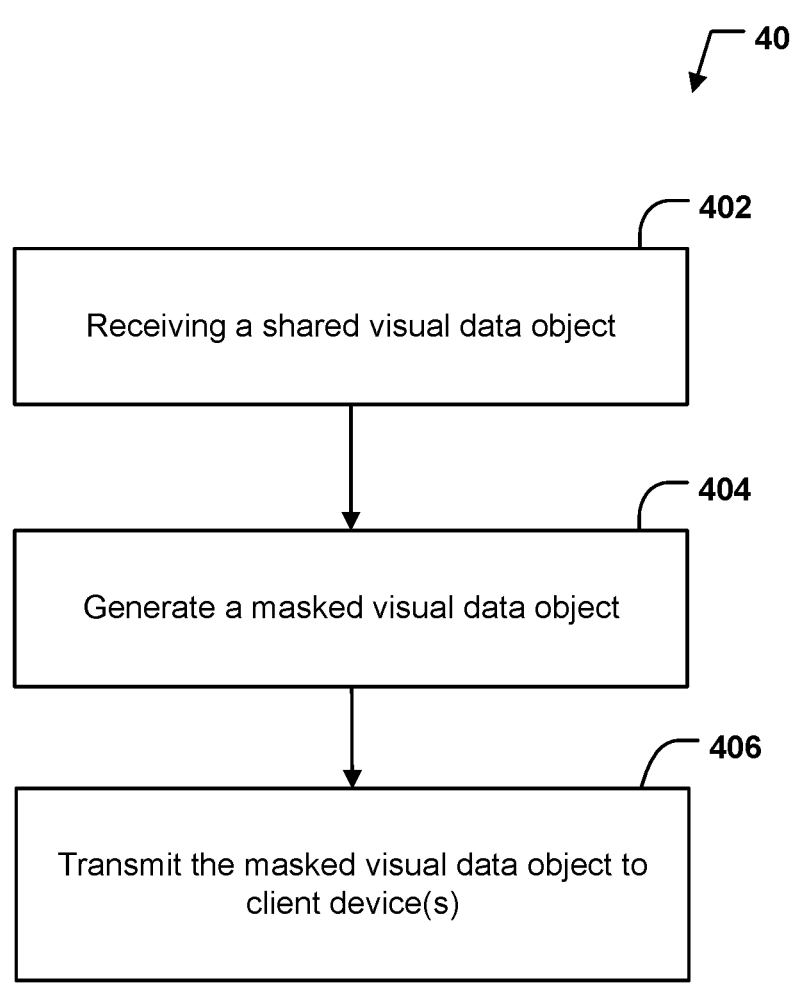
FIG. 4 illustrates an example flowchart for generating a masked visual data object using server-side operations and transmitting the masked visual data object to client devices, in accordance with some example embodiments described herein.

Turning to FIG. 4, example flowcharts are illustrated that contain example operations implemented by example embodiments described herein. The operations illustrated in FIG. 4 may, for example, be performed by the server device, which may in turn be embodied by an apparatus 200, which is in turn described in connection with FIG. 2. To perform the operations described below, the apparatus 200 may utilize one or more of processor 202, memory 204, communications hardware 206, user interface generation circuitry 208, and/or any combination thereof. In particular, FIG. 4 depicts example operations 400 for generating a masked visual data object that is provided to the client devices 102A-102N participating in an audiovisual conference session.

As shown in operation 402, the apparatus 200 includes means such as processor 202, memory 204, communications hardware 206, user interface generation circuitry 208, and/or any combination thereof for receiving a shared visual data object associated with an audiovisual conference session. In some embodiments, the communications hardware 206 receives the shared visual data object from a client device of any one client devices 102A-102N that is being used to share one or more user shared interfaces to other client devices participating in the audiovisual conference session.

In some embodiments, an audiovisual conference session describes a network-facilitated connection between two or more client devices that is used to transmit audiovisual data. In some embodiments, an audiovisual conference session is facilitated by a server device that is configured to receive communication packets from each client device that participates in the audiovisual conference session and transmit the communication packets to other client devices that participate in the audiovisual conference session. In some embodiments, an audiovisual conference session is facilitated by a peer-to-peer connection between the client devices participating in the audiovisual conference session, such that each client devices transmits communication packets directly to other client devices that participate in the audiovisual conference session. In some embodiments, the audiovisual conference session enables a participating user to share one or more user interfaces that are currently being displayed by the client device being used by the participating user with other users participating in the audiovisual conference session. In some of the noted embodiments, once a participating user selects to share one or more user interfaces with other participants in the audiovisual conference session, one or more packets containing the visual data associated with the shared user interfaces are transmitted (e.g., directly, indirectly via forwarding by an intermediate server device, and/or the like) by a client device being used by the sharing user to other client devices used by other participants of the audiovisual conference session.

In some embodiments, a shared visual data object contains visual data associated with one or more screen captures of one or more shared user interfaces being concurrently displayed as part of an audiovisual conference session. In some embodiments, a shared visual data object contains visual data associated with one time unit (e.g., one second, one millisecond, and/or the like) of screen captures associated with one or more concurrently-shared user interfaces. In some embodiments, a shared visual data object contains visual data associated with a defined number of consecutive time units of screen captures associated with one or more concurrently-shared user interfaces. In some embodiments, given a sequence of shared visual data objects that are sequentially transmitted by the same client device during the same audiovisual conference session and without the termination of the screen/interface sharing session: (i) the first shared visual data object in the sequence contains visual data associated with one or more screen captures of one or more shared user interfaces being concurrently displayed as part of an audiovisual conference session, and (ii) each subsequent shared visual data object contains data describing the difference between the particular shared visual data object and an immediately preceding shared visual data object in the sequence. In this way, small differences between consecutive shared visual data objects (e.g., a difference in a cursor location) may be represented by smaller "diff" files rather than by files than contain entireties of screen capture visual datasets, thus reducing network resource needs of facilitating an audiovisual conference session between two or more participating users using two or more client devices.

Figure 6:
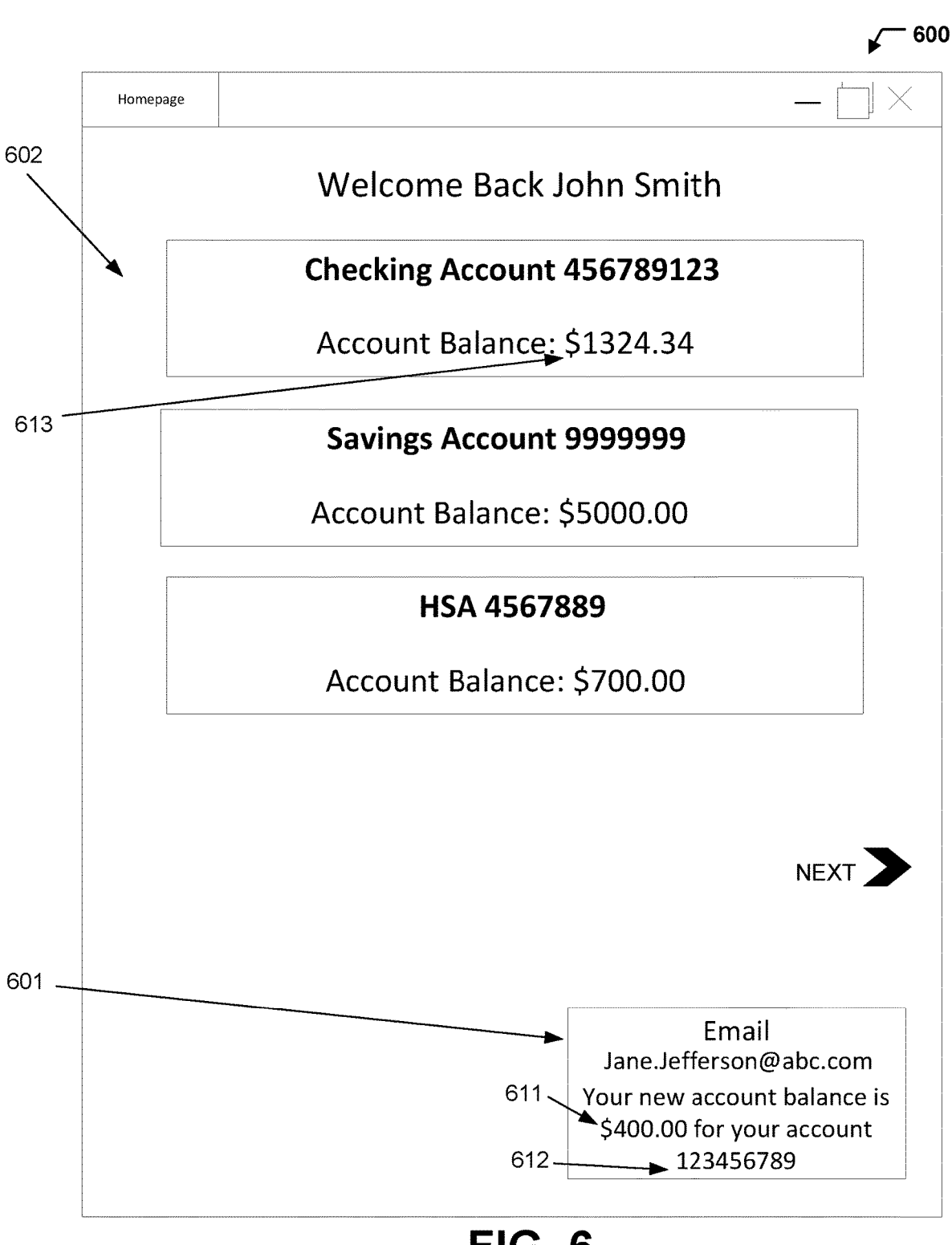
FIG. 6 provides an operational example of a shared visual data object, in accordance with some example embodiments described herein.

An operational example of visual data 600 associated with a shared visual data object is depicted in FIG. 6. As depicted in FIG. 6, the visual data 600 is associated with two sharing software applications: (i) an email management software application that is associated with the shared user interface 601, and (ii) an online banking client-side software application that is associated with the shared user interface 602. As further depicted in FIG. 6, the shared user interface 601 depicts a set of data values associated with the email management software application, such as the data values 611 and 612. As further depicted in FIG. 6, the shared user interface 602 depicts a set of data values associated with the online banking client-side software application, such as the data value 613.

As shown in operation 404, the apparatus 200 includes means such as processor 202, memory 204, communications hardware 206, user interface generation circuitry 208, and/or any combination thereof for generating a masked visual data object by applying one or more data masking operations on the shared visual data object. In some embodiments, the user interface generation circuitry 208 generates the masked visual data object based on the shared visual data object by applying one or more data masking operations on the shared visual data object.

A masked visual data object may be a visual data object that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures. In some embodiments, when the client device of a sharing user transmits a shared visual data object to a server device, the server device first generates a masked visual data object and then transmits the masked visual data object to non-sharing client devices. In some embodiments, in a peer-to-peer implementation, a sharing client device generates a masked visual data object and transmits the masked visual data object to non-sharing client devices. In some embodiments, in a peer-to-peer implementation, a sharing client device transmits the shared visual data object to non-sharing client devices, each non-sharing client device then generates a masked visual data object based on the shared visual data object and then displays data associated with the masked visual data object. As these exemplary implementations indicate, in implementations where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

Figure 5:
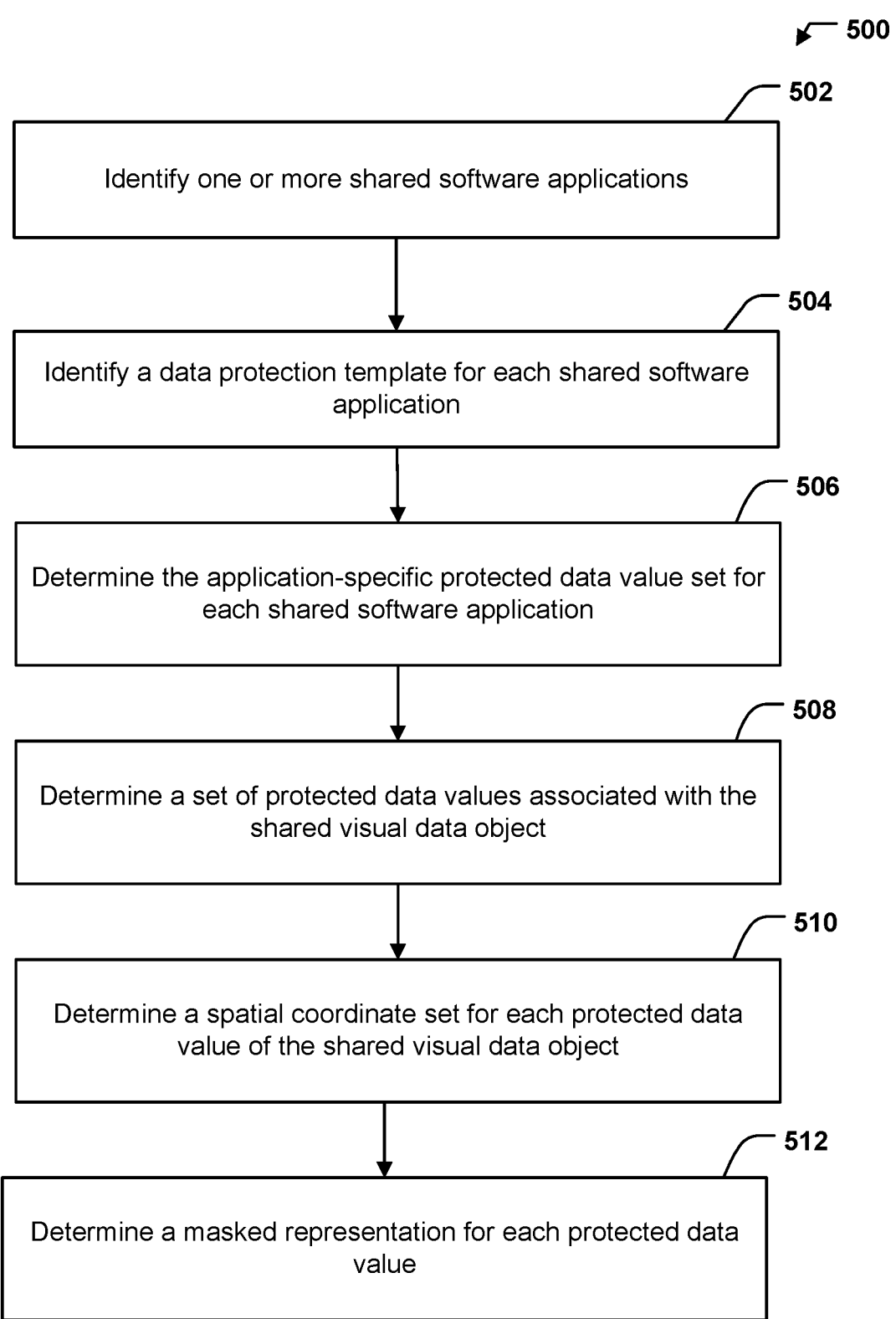
FIG. 5 illustrates an example flowchart for generating a masked visual data object based on a shared visual data object, in accordance with some example embodiments described herein.

FIG. 5 depicts example operations 500 for generating a masked visual data object based on a shared visual data object. As depicted in FIG. 5, at operation 502, the apparatus 200 includes means such as processor 202, memory 204, communications hardware 206, user interface generation circuitry 208, and/or any combination thereof for identifying one or more shared software applications based on the shared visual data object. In some embodiments, the user interface generation circuitry 208 detects the one or more shared software applications, for example based on data reported by an operating system application programming interface (API) for an operating system of the sharing client device and/or based on a content layout data object associated with the shared visual data object.

A shared software application describes a software application that is detected to be associated with at least one user interface whose screen captures are being displayed via the display data of a shared visual data object. For example, consider an exemplary embodiment in which a sharing user is sharing a screen that includes a portion of a user interface for a portable document format (PDF) document and a portion of a user interface for an email management software application. In this example, the shared software applications include the PDF display/management software application and the email management software application. In some embodiments, a client software application that facilitates user participation in an audiovisual conference session may enable the user to share either an entire screen or an entire user interface. In these embodiments, if the user chooses to share only a user interface and not an entire screen, then the resulting shared visual data object is associated with only one shared software application.

As described above, in some embodiments, a shared software application is detected based on data reported by an operating system application programming interface (API) for an operating system of the sharing client device. In some embodiments, the operating system API is associated with API calls that are configured to report which software applications are being displayed by which screens of the sharing client device. Such reporting data may be obtained by the sharing client device or by another device that is configured to use them to detect the shared software applications associated with a shared visual data object and then generate a masked visual data object based on the detected shared software applications. In some embodiments, the sharing client device is configured to obtain the data reporting displayed software applications by a particular screen of the sharing client device from the operating system API and transmit the obtained data to either a server device (in embodiments in which masked visual data objects are generated by server devices) or to a client device that is tasked with generated the masked visual data objects (in embodiments in which masked visual data objects are generated by non-sharing client devices). In some embodiments, to obtain data reported by the operating system API about application displays, the sharing client device is required to operate with root/administrator privilege level. Accordingly, in some embodiments, when the sharing client device is operating with root/administrator privilege level, shared software applications are detected via data reported by the operating system API for the operating system of the sharing software application. In some embodiments, when the sharing client device is not operating with root/administrator privilege level, shared software applications are detected via an alternative mechanism, for example based on analyzing a content layout data object associated with a shared visual data object.

In some embodiments, when a sharing client device is sharing a particular user interface instead of a screen in its entirety, metadata about the shared software application that is associated with the shared user interface is captured by the sharing client device based on user selection of the user interface. In some of the noted embodiments, the shared software application associated with the shared user interface is detected based on the noted metadata. In some embodiments, the sharing client device detects the sharing software application based on the user selection metadata and transmits the detected software application to either a server device (in embodiments in which masked visual data objects are generated by server devices) or to a client device that is tasked with generated the masked visual data objects (in embodiments in which masked visual data objects are generated by non-sharing client devices).

As further described above, in some embodiments, a shared software application is detected by analyzing a content layout data object associated with the shared visual data object. In some embodiments, a content layout data object describes content segments associated with a shared visual data object as well as spatial positioning of the noted content segments with respect to each other. For example, in some embodiments, a content layout data object describes, for each content segment (e.g., text segment, pictorial segment, and/or the like) associated with the shared visual data object: (i) the content data (e.g., text data) associated with the content segment, and (ii) one or more coordinate sets (e.g., a centroid coordinate set) for the content segment. As one example, a content layout data object for a shared visual data object may describe that the shared visual data object includes a text segment including the text data "Account Balance: $1342.34" whose centroid is at a point on the shared screen/interface associated with the horizontal coordinate $x_i$ and the vertical coordinate $y_i$. As another example, a content layout data object for a shared visual data object may describe that the shared visual data object includes a text segment including the text data "Account Holder: John Smith" whose centroid is at a point on the shared screen/interface associated with the horizontal coordinate $x_j$ and the vertical coordinate $y_i$.

In some embodiments, the content layout data object is obtained by performing one or more optical character recognition operations on the visual data associated with the shared visual data object. In some embodiments, once generated, the content layout data object is used to: (i) detect one or more shared user interfaces depicted by the shared visual data object, and (ii) for each shared user interface, a predicted share software application. For example, in some embodiments, the content layout data object is first used to generate one or more content segment units (e.g., text tokens or phrases for text segments). Then, a vector representation is generated for each content segment unit, where the vector representation may be generated based on both the content data for the content segment (e.g., a Word2Vec representation for a text segment unit, a convolutional representation for a pictorial segment unit, and/or the like) and the spatial coordinate set for the content segment. In some embodiments, once generated, the vector representations of content segment units are used by a clustering routine to determine one or more clusters of content segment units. Then, the visual data for the shared visual data object may be divided into one or more visual portions, where each visual portion is a contiguous portion of the visual data depicted by the shared visual data object that corresponds to a segment unit cluster and is generated in a manner that is configured to maximize the total number of segment units covered by the visual portions across all segment unit clusters. Once generated, each visual portion of the visual data depicted by the shared visual data object may be designated as the image representation of a shared user interface and provided to an image classification machine learning model that is configured to predict a respective software application for the image classification machine learning model from a schema of candidate software applications (e.g., a schema defined by software applications that are currently operating on a sharing client device as reported by the operating system API of the sharing client device, a schema defined by all of the software applications that may be deployed on sharing client devices in an intranet comprising the sharing client device, and/or the like).

As shown in operation 504, the apparatus 200 includes means such as processor 202, memory 204, communications hardware 206, user interface generation circuitry 208, and/or any combination thereof for identifying a data protection template for each shared software application. In some embodiments, the user interface generation circuitry 308 retrieves and/or receives the data protection templates for the shared software applications identified at operation 502 from a local storage device and/or a remote storage device.

In some embodiments, a data protection template describes which data fields that may be protected by a software application are designated as protected data fields. For example, the data protection template for an email management software application may describe that email sender field, email recipient fields, email subject field, and email body field are designated as protected data fields that should be masked when generating a masked visual data object for a shared user interface that is associated with the email management software application. In some embodiments, a data protection template describes which data fields of a software application are protected data fields and a respective masking operation for each protection data field. For example, the data protection template for an email management software application may describe that: (i) email sender field is a protected data field, (ii) email sender values in a shared user interface associated with the email management software application should be replaced with a randomly-generated email server value, (iii) the email body field is a protected data field, and (iv) email body values in a shared user interface associated with the email management software application should be replaced with a masking user interface element (e.g., a black box user interface element that covers the entirety of the depicted portion of an email body value in a shared user interface for the email management software application).

As the above-described examples illustrate, the same data field may be a protected data field in accordance with the data protection template of a first software application and an unprotected data field in accordance with the data protection template of a second software application. When this scenario occurs, a data value corresponding to the data field that is depicted using a shared user interface for the first software application is replaced with a masked representation as part of generating a masked visual data object, while a data value corresponding to the data field that is depicted using a shared user interface for the second software application is not replaced with a masked representation as part of generating a masked visual data object. For example, an account balance field may be a protected data field in accordance with the data protection template of an online banking client-side software application but an unprotected data field in accordance with the data protection template of an email management software application. In this example, a shared user interface for an online banking client-side software application may include a masked representation of an account balance value, while a shared user interface for an online banking client-side software application may include an account balance value.

In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object. For example, the data protection template for an online banking client-side software application may require that account balance values be replaced by a randomly-generated account balance value as part of generating a masked visual data object, while the data protection template for an email management software application may require that account balance data values be replaced by a black-box masking user interface element as part of generating a masked visual data object. In this example, a shared user interface for an online banking client-side software application may include a randomly-generated account balance value, while a shared user interface for an email management software application may include a black box user interface element that covers an area of the screen that depicts an account balance value reported by the email management software application.

In some embodiments, a protected data value is a data value that is depicted by a user interface and is associated with a protected data field of the user interface as described by the data protection template for the software application corresponding to user interface. In some embodiments, each user interface is configured to depict a set of data values for a set of data fields, where each data value is the value depicted by the user interface for a respective data field. For example, an account information user interface may be configured to depict an account balance data value for an account balance data field and an account number data value for an account number data field. In some embodiments, when a data value is associated with a protected data field, the data value is designated as being a protected data value, while a data value that is associated with an unprotected data field is designated as being an unprotected data value. For example, when the data protection template for the software application associated with an account information user interface may describe that the account balance data field is a protected data field while the account number data field is an unprotected data field, then the account balance data value that is depicted by the account information user interface may be designated as being a protected data value, while the account number data value that is depicted by the account information user interface may be designated as being an unprotected data value.

In some embodiments, each shared software application is associated with a set of protected data fields whose data values are being depicted by the visual data associated with a shared visual data object. These protected data fields are referred to herein as an "application-specific protected data field set" for the shared software application. For example, the data protection template for an email management software application may describe that email sender field, email recipient fields, email subject field, and email body field are designated as protected data fields that should be masked when generating a masked visual data object for a shared user interface that is associated with the email management software application. In this example, if the email sender field, the email recipient fields, and the email subject field of an email are being depicted by a shared user interface for the email management software application whose visual data are described by the shared visual data object, then the application-specific data field set for the email management software application include the email sender field, the email recipient fields, and the email subject field.

In some embodiments, the data values depicted by the shared user interface for a shared software application that are associated with the application-specific protected data field set for the shared software application are referred to herein as an "application-specific protected data value set" for the shared software application. For example, the application-specific data field set for the email management software application include the email sender field, the email recipient fields, and the email subject field, then the application-specific protected data value set for the email management software application include the email sender value depicted by a shared user interface that is associated with the email management software application, the email recipient list value depicted by a shared user interface that is associated with the email management software application, and the email subject value depicted by a shared user interface that is associated with the email management software application.

An operational example of a data protection template 700 for an email management software application is depicted in FIG. 7. As depicted in FIG. 7, the data protection template 700 designates a set of data fields that may be depicted by user interfaces associated with the email management software application as a protected data field. The protected data fields include, for example, protected data fields that is associated with the data values 611 and 612 of FIG. 6. According to the data protection template 700, an account balance protected data field, which corresponds to data value 611, is associated with a "black box" data masking operation, which may replace the account balance data value with a black-box masking user interface element. Additionally, an account number data field, which corresponds to data value 612, is associated with a "synthetic" data masking operation, which may replace the account number data value with randomly-generated values (e.g., synthetic data).

As shown in operation 506, the apparatus 200 includes means such as processor 202, memory 204, communications hardware 206, user interface generation circuitry 208, and/or any combination thereof for determining the application-specific protected data value set for each shared software application that is identified in operation 504. In some embodiments, the user interface generation circuitry 308 determines the application-specific protected data value set for each shared software application based on the data protection template for the shared software application and the data values depicted by the visual data of the shared visual data object.

In some embodiments, each shared software application is associated with a set of protected data fields whose data values are being depicted by the visual data associated with a shared visual data object. These protected data fields are referred to herein as an "application-specific protected data field set" for the shared software application. For example, the data protection template for an email management software application may describe that email sender field, email recipient fields, email subject field, and email body field are designated as protected data fields that should be masked when generating a masked visual data object for a shared user interface that is associated with the email management software application. In this example, if the email sender field, the email recipient fields, and the email subject field of an email are being depicted by a shared user interface for the email management software application whose visual data are described by the shared visual data object, then the application-specific data field set for the email management software application include the email sender field, the email recipient fields, and the email subject field.

In some embodiments, the data values depicted by the shared user interface for a shared software application that are associated with the application-specific protected data field set for the shared software application are referred to herein as an "application-specific protected data value set" for the shared software application. For example, the application-specific data field set for the email management software application include the email sender field, the email recipient fields, and the email subject field, then the application-specific protected data value set for the email management software application include the email sender value depicted by a shared user interface that is associated with the email management software application, the email recipient list value depicted by a shared user interface that is associated with the email management software application, and the email subject value depicted by a shared user interface that is associated with the email management software application.

As the above example illustrates, in some embodiments, to determine the application-specific protected data value set for a shared software application, two operations may need to be performed: (i) detecting which data values of the software application are being depicted by the shared user interface(s) of the shared visual data object, and (ii) determining which of those depicted data fields are associated with data fields that are designated as being protected data fields by the data protection template for the shared software application. Accordingly, in some embodiments: (i) data values depicted in shared user interface(s) that are associated with a shared software application are detected, (ii) each depicted data value is mapped to a data field, (iii) each mapped data field is designated as either being a protected data field or an unprotected data field based on the designations defined by the application-specific protected data field set for the shared software application as provided in the data protection template for the shared software application, and (iv) those depicted data values that are associated with a protected data field are designated as a protected data value that is part of the application-specific protected data value set for the shared software application.

As shown in operation 508, the apparatus 200 includes means such as processor 202, memory 204, communications hardware 206, user interface generation circuitry 208, and/or any combination thereof for determining a set of protected data values associated with the shared visual data object. In some embodiments, the user interface generation circuitry 308 determines the set of protected data values for the shared visual data object by combining the application-specific protected data value sets across all the shared software applications that are associated with the shared visual data object. In some embodiments, the user interface generation circuitry 308 also determines a set of protected data field for the shared visual data object by combining the application-specific protected data field sets across all the shared software applications that are associated with the shared visual data object. In some embodiments, a protected data field is the data field for a protected data value that is being depicted by the visual data associated with the shared visual data object.

For example, if a shared visual data object is associated with an email management software application and a document viewing software application, the shared user interface for the email management software application is depicting a first protected data value that is an email sender value and a second protected data value that is an email recipient list value, and the shared user interface for the document viewing software application is depicting a first protected data value that is a document body value, then the set of protected data fields associated with the shared visual data object include the email sender field, the email recipient list field, and the document body field, while the set of protected data values associated with the shared visual data object include the email sender value, the email recipient list value, and the document body value. In this example, the email sender value is a protected data value that is associated with the email sender field as its respective protected data field, the email recipient list value is a protected data value that is associated with the email recipient list field as its respective protected data field, and the document body value is a protected data value that is associated with the document body field as its respective protected data field.

As shown in operation 510, the apparatus 200 includes means such as processor 202, memory 204, communications hardware 206, user interface generation circuitry 208, and/or any combination thereof for determining a spatial coordinate set for each protected data value of the shared visual data object as detected in operation 508. In some embodiments, the user interface generation circuitry 308 determines a spatial coordinate for each protected data value based on the content layout data object for the shared visual data object.

In some embodiments, a spatial coordinate set describes one or more coordinate pairs for a respective data value, where each coordinate pair includes a horizontal coordinate value and a vertical coordinate value. In some embodiments, visual data for a shared visual data object is used to generate a two-dimensional coordinate system with a vertical coordinate and a horizontal coordinate system. In some of the noted embodiments, when a content segment unit corresponding to a data value is detected within the content layout data object for the shared visual data object, the location of the content segment unit within the visual data for the shared visual data object as determined based on the location of the content segment unit within the layout depicted by the content layout data object is mapped to one or more points in the coordinate system. For example, in some embodiments, the location of the content segment unit may be mapped to a point in the coordinate system that corresponds to a centroid location for the content segment unit. As another example, in some embodiments, the location of the content segment unit may be mapped to four points in the coordinate system that correspond to corner points of a bounding box including the content segment unit. In some embodiments, once the location of a content segment unit for a data value is mapped to one or more coordinate system points, the coordinates of those coordinate points are used to describe the spatial coordinate set for the data value. While various embodiments of the present invention describe generating coordinates for points within a two-dimensional plane using a rectangular/Cartesian coordinate system, a person of ordinary skill in the relevant technology will recognize that other coordinate systems such as the polar coordinate system may be used. In general, a spatial coordinate set for a data value may describe coordinate values for one or more points associated with the location of the data value within a two-dimensional plane associated with a shared visual data object that depicts the data value using its visual data.

As shown in operation 512, the apparatus 200 includes means such as processor 202, memory 204, communications hardware 206, user interface generation circuitry 208, and/or any combination thereof for determining a masked representation for each protected data value that is detected in operation 508. In some embodiments, the user interface generation circuitry 308 determines a masked representation for each protected data value based on the shared software application that is associated with the protected data value.

In some embodiments, a masked representation describes a visual and/or data representation of a corresponding data value that does not describe the corresponding data value and/or cannot be used to detect what the corresponding data value is. In some embodiments, the masked representation for a respective protected data value comprises a mask user interface element, such a mask user interface element that depicts the user interface region associated with the respective protected value as a redacted region. In some embodiments, the masked representation for a respective protected data value comprises a masked data value that is different from the respective protected data value. In some embodiments, the masked data value is a randomly-generated data value. In some embodiments, the randomly-generated data value is determined based on a probability distribution whose parameters (e.g., whose mean and/or standard deviation) are determined based on the respective protected data value.

In some embodiments, a masked representation is generated by applying a data masking operation to a protected data value, where the data masking operation for the protected data value may be defined by a data protection template for a shared software application that is associated with the protected data value. In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object. For example, the data protection template for an online banking client-side software application may require that account balance values be replaced by a randomly-generated account balance value as part of generating a masked visual data object, while the data protection template for an email management software application may require that account balance data values be replaced by a black-box masking user interface element as part of generating a masked visual data object. In this example, a shared user interface for an online banking client-side software application may include a randomly-generated account balance value, while a shared user interface for an email management software application may include a black box user interface element that covers an area of the screen that depicts an account balance value reported by the email management software application.

As shown in operation 512, the apparatus 200 includes means such as processor 202, memory 204, communications hardware 206, user interface generation circuitry 208, and/or any combination thereof for generating a masked visual data object based on the masked representations determined in operation 510 and the spatial coordinate sets determined in operation 508. In some embodiments, the user interface generation circuitry 208 determines the masked visual data object by replacing each protected data value of the shared visual data object with the masked representation of the protected data value and in a location that is determined based on the spatial coordinate set for the protected data value. A masked visual data object may be a visual data object that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures.

Returning to FIG. 4, at operation 406, the apparatus 200 includes means such as processor 202, memory 204, communications hardware 206, user interface generation circuitry 208, and/or any combination thereof for transmitting the masked visual data object to one or more client devices. In some embodiments, the communications hardware 206 transmits the masked visual data object to each non-sharing client device associated with the audiovisual conference session. In some embodiments, the communications hardware 206 transmits the masked visual data object to each client device associated with the audiovisual conference session including the sharing client device associated with the audiovisual conference session. In some embodiments where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

Figure 8:
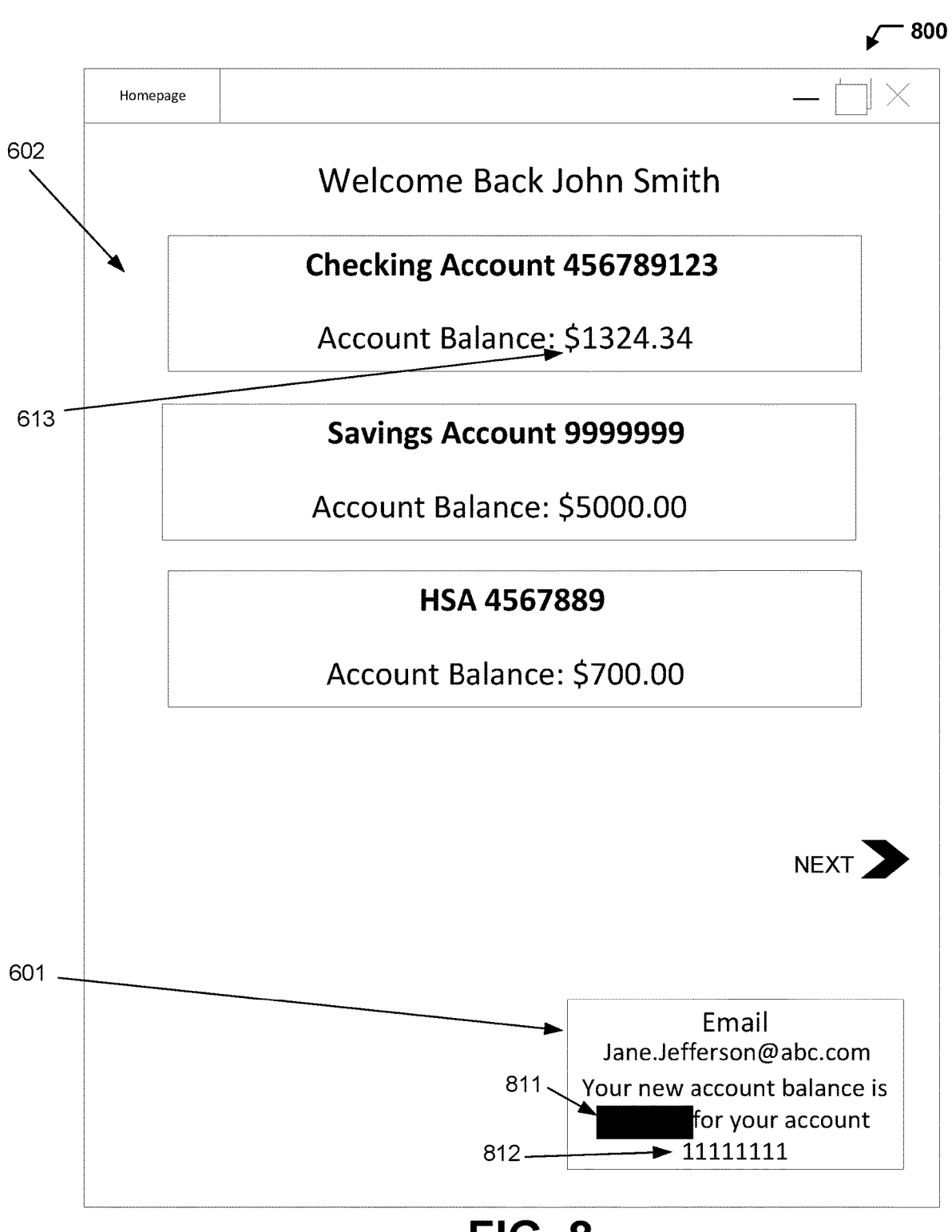
FIG. 8 provides an operational example of a masked visual data object, in accordance with some example embodiments described herein.

An operational example of visual data 800 associated with a masked visual data object that is generated by modifying the shared visual data object that is associated with FIG. 6 in accordance with the data protection template 700 of FIG. 7. As depicted in FIG. 8, the visual data 800 includes a masked representation 811 for the data value 611 that is a black-box interface element and a masked representation 812 for the data value 612 that is a randomly-generated value, in accordance with the data masking operation defined for the corresponding data field by the data protection template 700 of FIG. 7.

Example Client-Side Operations by a Sharing Client Device

Figure 9:
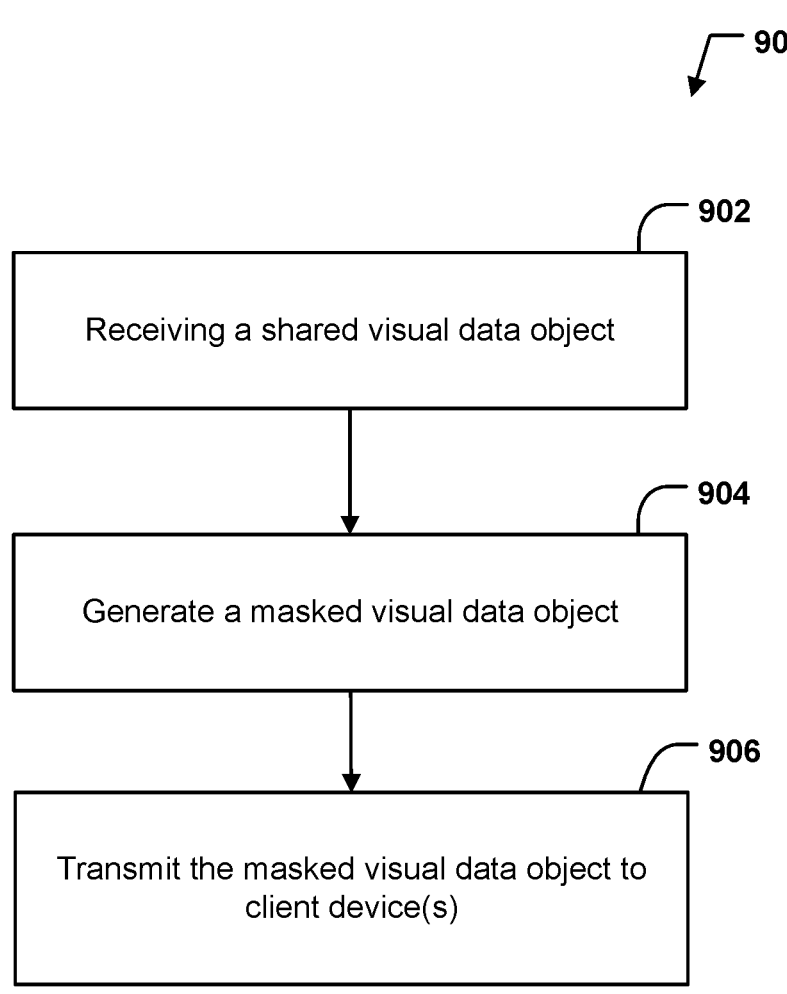
FIG. 9 illustrates an example flowchart for generating a masked visual data object using operations performed by a sharing client device and transmitting the masked visual data object to non-sharing client devices, in accordance with some example embodiments described herein.

Turning to FIG. 9, example flowcharts are illustrated that contain example operations implemented by example embodiments described herein. The operations illustrated in FIG. 9 may, for example, be performed by the server device, which may in turn be embodied by an apparatus 300, which is in turn described in connection with FIG. 3. To perform the operations described below, the apparatus 300 may utilize one or more of processor 302, memory 304, communications hardware 306, user interface generation circuitry 308, and/or any combination thereof. In particular, FIG. 9 depicts example operations 900 for generating a masked visual data object by a sharing client device and providing the masked visual data object to non-sharing client device.

As shown in operation 902, the apparatus 300 includes means such as processor 302, memory 304, communications hardware 306, user interface generation circuitry 308, and/or any combination thereof for receiving a shared visual data object. In some embodiments, the user interface generation circuitry 308 receives the shared visual data object by capturing a screen and/or a user interface that is being shared by a client-side application that enables user participation in an audiovisual conference session.

In some embodiments, an audiovisual conference session describes a network-facilitated connection between two or more client devices that is used to transmit audiovisual data. In some embodiments, an audiovisual conference session is facilitated by a server device that is configured to receive communication packets from each client device that participates in the audiovisual conference session and transmit the communication packets to other client devices that participate in the audiovisual conference session. In some of the noted embodiments, once a participating user selects to share one or more user interfaces with other participants in the audiovisual conference session, one or more packets containing the visual data associated with the shared user interfaces are transmitted (e.g., directly, indirectly via forwarding by an intermediate server device, and/or the like) by a client device being used by the sharing user to other client devices used by other participants of the audiovisual conference session. In some embodiments, a shared visual data object contains visual data associated with one or more screen captures of one or more shared user interfaces being concurrently displayed as part of an audiovisual conference session. In some embodiments, a shared visual data object contains visual data associated with one time unit (e.g., one second, one millisecond, and/or the like) of screen captures associated with one or more concurrently-shared user interfaces. In some embodiments, a shared visual data object contains visual data associated with a defined number of consecutive time units of screen captures associated with one or more concurrently-shared user interfaces.

As shown in operation 904, the apparatus 300 includes means such as processor 302, memory 304, communications hardware 306, user interface generation circuitry 308, and/or any combination thereof for generating a masked visual data object based on the shared visual data object. In some embodiments, the user interface generation circuitry 308 generates the masked visual data object based on the shared visual data object by applying one or more data masking operations on the shared visual data object. In some embodiments, to generate the masked visual data object, the user interface generation circuitry 308 may perform at least some of the operations 500 of FIG. 5.

A masked visual data object may be a visual data object that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures. In some embodiments, the user interface generation circuitry 308 determines the masked visual data object by replacing each protected data value of the shared visual data object with the masked representation of the protected data value and in a location that is determined based on the spatial coordinate set for the protected data value.

In some embodiments, a masked visual data object is determined based on data protection templates for shared software applications that are associated with the shared visual data object. describes which data fields that may be protected by a software application are designated as protected data fields. For example, the data protection template for an email management software application may describe that email sender field, email recipient fields, email subject field, and email body field are designated as protected data fields that should be masked when generating a masked visual data object for a shared user interface that is associated with the email management software application. In some embodiments, a data protection template describes which data fields of a software application are protected data fields and a respective masking operation for each protection data field.

For example, the data protection template for an email management software application may describe that: (i) email sender field is a protected data field, (ii) email sender values in a shared user interface associated with the email management software application should be replaced with a randomly-generated email server value, (iii) the email body field is a protected data field, and (iv) email body values in a shared user interface associated with the email management software application should be replaced with a masking user interface element (e.g., a black box user interface element that covers the entirety of the depicted portion of an email body value in a shared user interface for the email management software application). As the above-described examples illustrate, the same data field may be a protected data field in accordance with the data protection template of a first software application and an unprotected data field in accordance with the data protection template of a second software application. In some embodiments, when a data field is designated as protected data field in accordance with the data protection templates of two software application, the data protection template for the first software application may require a first data masking operation for the data field as part of generating a masked visual data object, while the data protection template for the second software application may require a second data masking operation for the data field as part of generating a masked visual data object.

As shown in operation 906, the apparatus 300 includes means such as processor 302, memory 304, communications hardware 306, user interface generation circuitry 308, and/or any combination thereof for transmitting the masked visual data object to one or more non-sharing client devices associated with the audiovisual conference session. In some embodiments, the communications hardware 306 transmits the masked visual data object to each non-sharing client device associated with the audiovisual conference session. In some embodiments where display data for non-sharing client devices is generated using masked visual data objects, such display is associated with a delay, which is the delay associated with converting shared visual data objects to masked visual data objects. In some embodiments, to enable audiovisual conference sessions that facilitate seamless and real-time or near-real-time exchange of data, such conversion/masking delays should be reduced.

Example Client-Side Operations by a Non-Sharing Client Device

Figure 10:
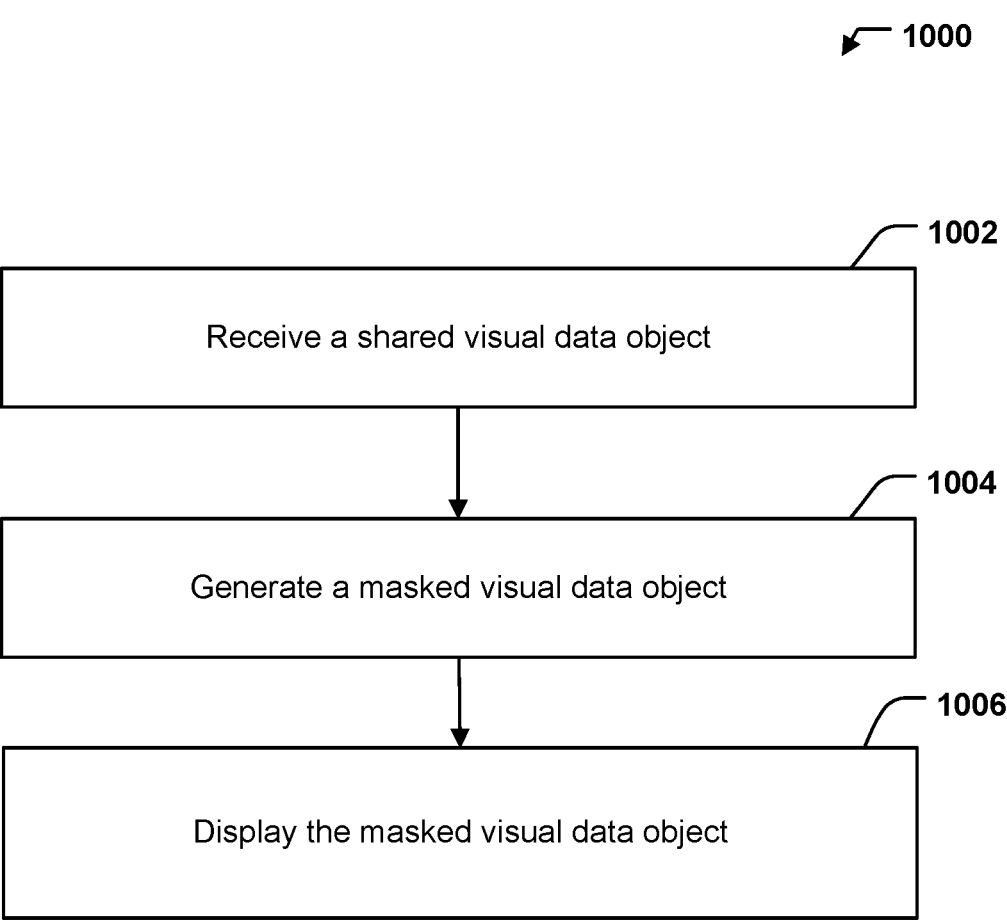
FIG. 10 illustrates an example flowchart for generating a masked visual data object using operations performed by a non-sharing client device and displaying the masked visual data object using a display device of non-sharing client device, in accordance with some example embodiments described herein.

Turning to FIG. 10, example flowcharts are illustrated that contain example operations implemented by example embodiments described herein. The operations illustrated in FIG. 10 may, for example, be performed by the server device, which may in turn be embodied by an apparatus 300, which is in turn described in connection with FIG. 3. To perform the operations described below, the apparatus 300 may utilize one or more of processor 302, memory 304, communications hardware 306, user interface generation circuitry 308, and/or any combination thereof. In particular, FIG. 10 depicts example operations 1000 for generating a masked visual data object by a non-sharing client device and displaying the masked visual data object using a display device of a non-sharing client device.

As shown in operation 1002, the apparatus 300 includes means such as processor 302, memory 304, communications hardware 306, user interface generation circuitry 308, and/or any combination thereof for receiving a shared visual data object. In some embodiments, the communications hardware 206 receives the shared visual data object from a client device, such as client device 102A, that is being used to share one or more user shared interfaces to other client devices, such as client device 102B, participating in the audiovisual conference session.

In some embodiments, an audiovisual conference session describes a network-facilitated connection between two or more client devices that is used to transmit audiovisual data. In some embodiments, an audiovisual conference session is facilitated by a server device that is configured to receive communication packets from each client device that participates in the audiovisual conference session and transmit the communication packets to other client devices that participate in the audiovisual conference session. In some of the noted embodiments, once a participating user selects to share one or more user interfaces with other participants in the audiovisual conference session, one or more packets containing the visual data associated with the shared user interfaces are transmitted (e.g., directly, indirectly via forwarding by an intermediate server device, and/or the like) by a client device being used by the sharing user to other client devices used by other participants of the audiovisual conference session. In some embodiments, a shared visual data object contains visual data associated with one or more screen captures of one or more shared user interfaces being concurrently displayed as part of an audiovisual conference session. In some embodiments, a shared visual data object contains visual data associated with one time unit (e.g., one second, one millisecond, and/or the like) of screen captures associated with one or more concurrently-shared user interfaces. In some embodiments, a shared visual data object contains visual data associated with a defined number of consecutive time units of screen captures associated with one or more concurrently-shared user interfaces.

In some embodiments, a masked visual data object is determined based on data protection templates for shared software applications that are associated with the shared visual data object. describes which data fields that may be protected by a software application are designated as protected data fields. For example, the data protection template for an email management software application may describe that email sender field, email recipient fields, email subject field, and email body field are designated as protected data fields that should be masked when generating a masked visual data object for a shared user interface that is associated with the email management software application. In some embodiments, a data protection template describes which data fields of a software application are protected data fields and a respective masking operation for each protection data field.

For example, the data protection template for an email management software application may describe that: (i) email sender field is a protected data field, (ii) email sender values in a shared user interface associated with the email management software application should be replaced with a randomly-generated email server value, (iii) the email body field is a protected data field, and (iv) email body values in a shared user interface associated with the email management software application should be replaced with a masking user interface element (e.g., a black box user interface element that covers the entirety of the depicted portion of an email body value in a shared user interface for the email management software application). As the above-described examples illustrate, the same data field may be a protected data field in accordance with the data protection template of a first software application and an unprotected data field in accordance with the data protection template of a second software application. In some embodiments, when a data field is designated as protected data field in accordance with the data protection templates of two software applications, the data protection template for the first software application may require a first data masking operation for the data field as part of generating a masked visual data object, while the data protection template for the second software application may require a second data masking operation for the data field as part of generating a masked visual data object.

As shown in operation 1004, the apparatus 300 includes means such as processor 302, memory 304, communications hardware 306, user interface generation circuitry 308, and/or any combination thereof for generating a masked visual data object based on the shared visual data object. In some embodiments, the user interface generation circuitry 308 208 generates the masked visual data object based on the shared visual data object by applying one or more data masking operations on the shared visual data object.

A masked visual data object may be a visual data object that contains visual data associated with one or more modified versions of screen captures of one or more shared user interfaces being concurrently displayed as part of an audiovisual conference session, where the noted screen capture modification operations are performed by applying one or more data masking operations on protected data values being detected in the original screen captures. In some embodiments, the user interface generation circuitry 308 determines the masked visual data object by replacing each protected data value of the shared visual data object with the masked representation of the protected data value and in a location that is determined based on the spatial coordinate set for the protected data value.

As shown in operation 1006, the apparatus 300 includes means such as processor 302, memory 304, communications hardware 306, user interface generation circuitry 308, and/or any combination thereof for displaying the masked visual data object using a display device of the non-sharing client device. In some embodiments, the user interface generation circuitry 308 displays a user interface that depicts visual data associated with the masked visual data object.

Example Operations

Figure 11A:
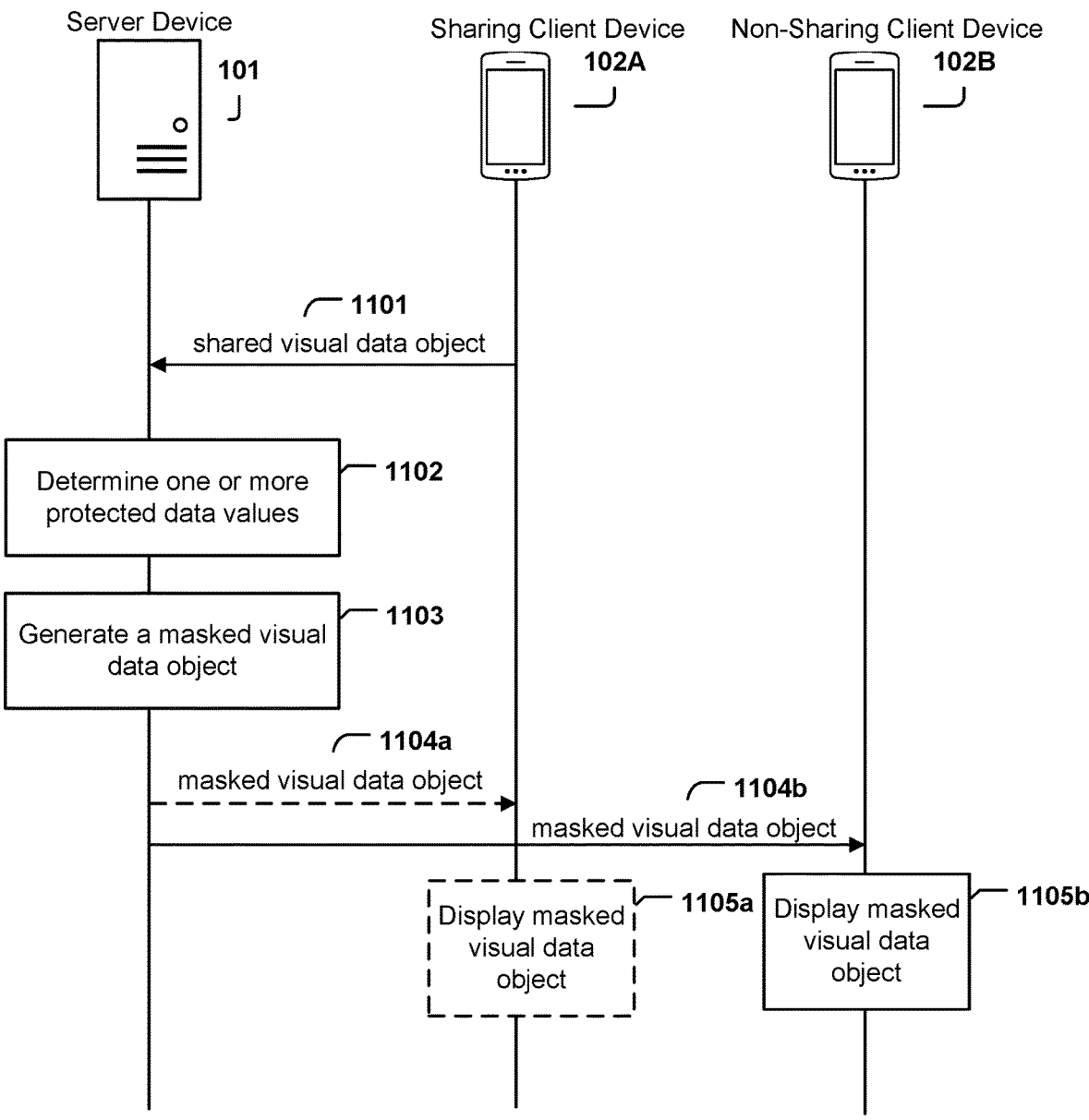
FIG. 11A illustrates a swim lane diagram of operations for protected display of a requested user interface using server side operations, in accordance with some example embodiments described herein.
Figure 11B:
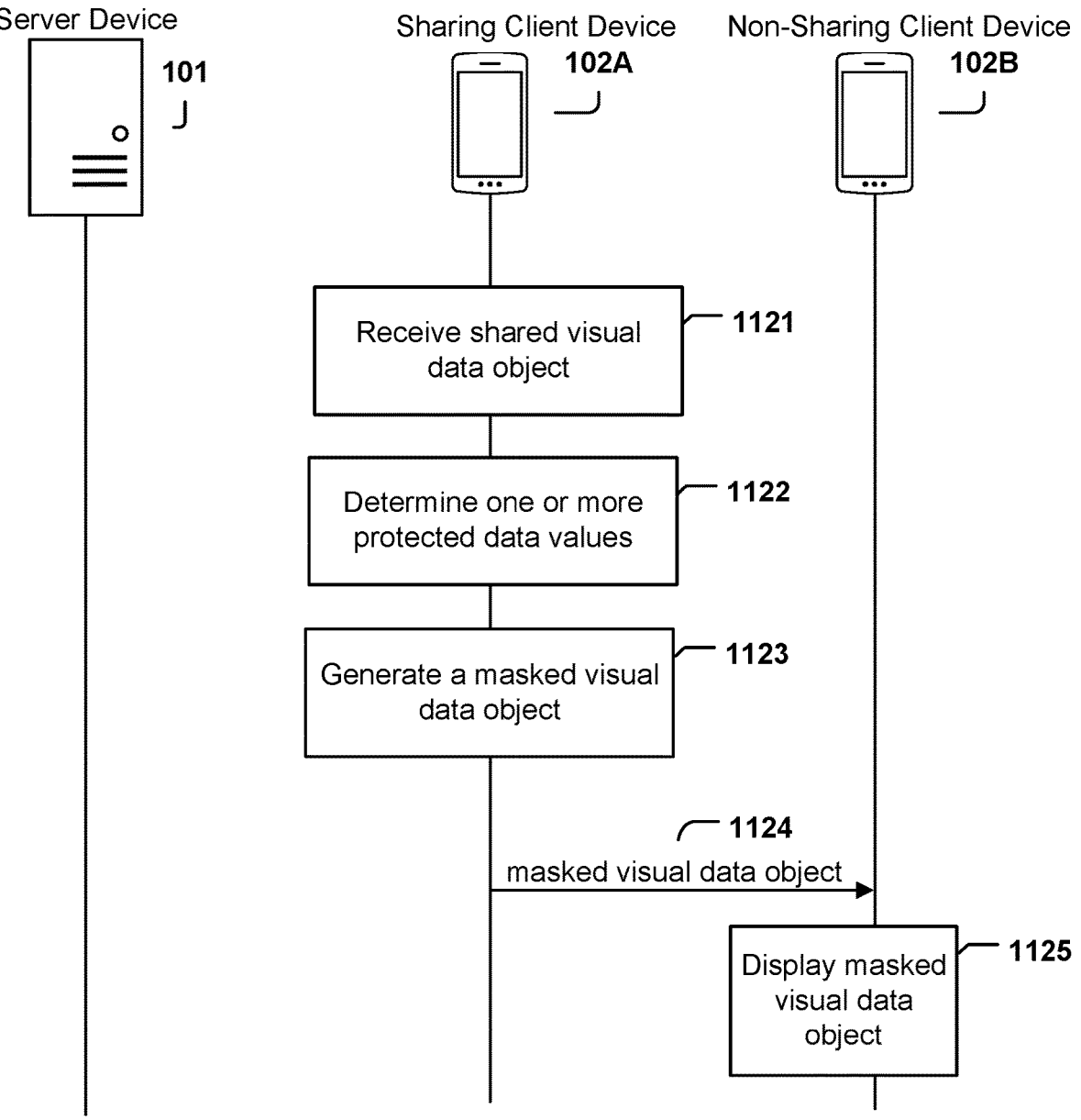
FIG. 11B illustrates a swim lane diagram of operations for protected display of a requested user interface using operations performed by a sharing client device and transmitting the masked visual data object to non-sharing client devices, in accordance with some example embodiments described herein.
Figure 11C:
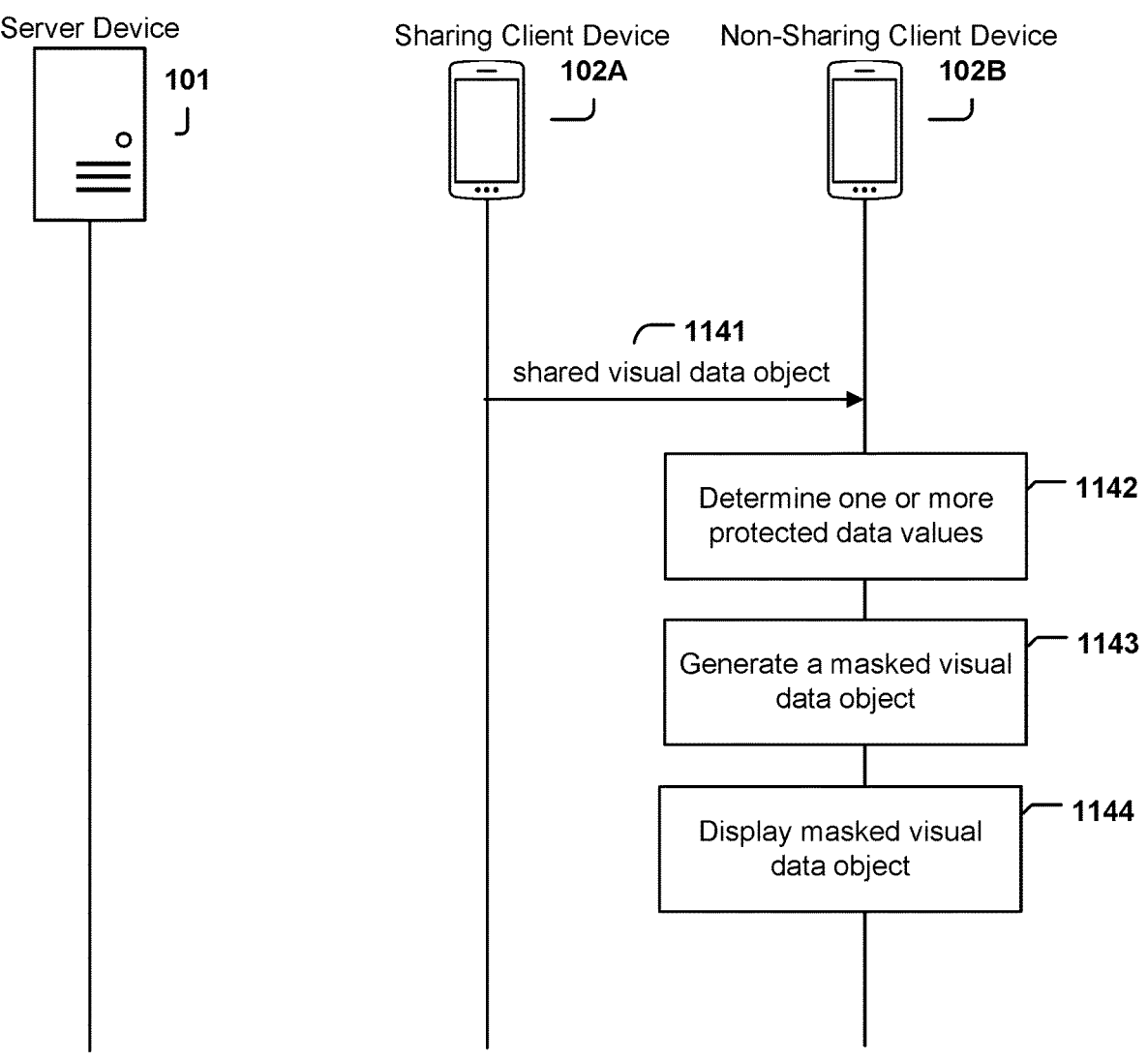
FIG. 11C illustrates a swim lane diagram of operations for protected display of a requested user interface using operations performed by a non-sharing client device, in accordance with some example embodiments described herein.

FIGS. 11A-11C show swim lane diagrams illustrating example operations (e.g., as described above in connection with FIGS. 4-10) performed by components of the environment depicted in FIG. 1 to produce various benefits from example embodiments. In these figures, operations performed by a server device 101 are shown along the vertical line extending from the element labeled "server device," operations performed by a client device which is sharing content, such as client device 102A is shown along the vertical line extending from the element labeled "sharing client device", operations performed by a client device which is not sharing content, such as client device 102B are shown along the vertical line extending from the element labeled "sharing client device." Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

FIG. 11A depicts example operations for example embodiments where a server device 101 generates a masked visual data object and provides it to non-sharing client device 102B and in some embodiments, sharing client device 102A. At operation 1101, the sharing client device 102A provides a shared visual data object to server device 101. At operation 1102, server device 101 determines one or more protected data values based on the shared visual data object. At operation 1103, server device 101 generates a masked visual data object based on determined masked representations and a spatial coordinate set associated with the protected data values. At operation 1104b, server device 101 provides the masked visual data object to a non-sharing client device 102B. In some embodiments, at operation 1104a server device 101 provides the masked visual data object to a sharing client device 102A. At operation 1105a, in an instance sharing client device 102A received the masked visual data object from server device 101, sharing client device 102A may display the masked visual data object. At operation 1105b non-sharing client device 102B displays the masked visual data object.

FIG. 11B depicts example operations for example embodiments where a sharing client device 102A generates a masked visual data object and provides it to non-sharing client device 102B. At operation 1121, the sharing client device 102A receives a shared visual data object, such as via capture of a screen or user interface being shared by the sharing client device 102A. At operation 1122, sharing client device 102A determines one or more protected data values based on the shared visual data object. At operation 1123, sharing client device 102A generates a masked visual data object based on determined masked representations and a spatial coordinate set associated with the protected data values. At operation 1124, sharing client device 102A provides the masked visual data object to a non-sharing client device 102B. At operation 1125, non-sharing client device 102B displays the masked visual data object.

FIG. 11C depicts example operations for example embodiments where a non-sharing client device 102B generates a masked visual data object. At operation 1141, the sharing client device 102A provides the non-sharing client device with a shared visual data object. At operation 1142, non-sharing client device 102B determines one or more protected data values based on the shared visual data object. At operation 1143, non-sharing client device 102B generates a masked visual data object based on determined masked representations and a spatial coordinate set associated with the protected data values. At operation 1144, non-sharing client device 102B displays the masked visual data object.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:
1. A method for protected display of a shared visual data object associated with an audiovisual conference session, the method comprising:
    receiving, using communications hardware, the shared visual data object, wherein the shared visual data object comprises visual data associated with one or more shared user interfaces;
    determining, using user interface generation circuitry and based on the shared visual data object, a plurality of protected data values, wherein each protected data value is associated with a protected data field and determining the plurality of protected data values comprises:
        identifying one or more shared software applications,
        for each shared software application, determining an application-specific protected data value set based on a data protection template for the shared software application, determining the plurality of protected data values based on each application-specific protected data value set, and determining a data masking operation for each of the plurality of protected data values based on a corresponding protected data field and using the data protection template for the corresponding shared software application;

for each protected data value:

generating, using the user interface generation circuitry, a masked representation by applying a corresponding data masking operation for the protected data field that is associated with the protected data value to the protected data value, wherein the data masking operation is at least one of (a) visually obscuring the protected data value or (b) replacing the protected data value with a randomly-generated data value, and determining, based on a layout data object for the shared visual data object, a spatial coordinate set for the protected data value;

generating, using the user interface generation circuitry, a masked visual data object based on each masked representation and each spatial coordinate set; and causing, using the user interface generation circuitry, the masked visual data object to be displayed using the audiovisual conference session.

2. The method of claim 1, wherein identifying the one or more shared software applications comprises:

determining the one or more shared user interfaces associated with the shared visual data object; and for each shared user interface, determining, based on the shared user interface, a respective shared software application of the one or more shared software applications.

3. The method of claim 2, wherein the one or more shared user interfaces are determined based on a content layout data object.

4. The method of claim 3, wherein the content layout data object is generated using one or more optical character recognitions that are performed on the shared visual data object.

5. The method of claim 2, wherein determining the respective shared software application for a first shared user interface of the one or more shared user interfaces comprises:

determining an image representation for the first shared user interface, and determining the respective shared software application based on the image representation and using an image classification machine learning model.

6. The method of claim 1, wherein the masked representation for a respective protected data value comprises a mask user interface element.

7. The method of claim 1, wherein the masked representation for a respective protected data value comprises a masked data value that is different from the respective protected data value.

8. The method of claim 1, wherein the randomly-generated data value is determined based on a probability distribution whose parameters are determined based on the respective protected data value.

9. The method of claim 1, wherein:

the method is being performed by a server device, and causing the masked visual data object to be presented comprises providing the masked visual data object to a client device.

10. The method of claim 1, wherein:

the method is being performed by a client device, and causing the masked visual data object to be presented comprises displaying the masked visual data object.

11. An apparatus for protected display of a shared visual data object associated with an audiovisual conference session, the apparatus comprising:

communications hardware configured to:

receive the shared visual data object, wherein the shared visual data object comprises visual data associated with one or more shared user interfaces, and user interface generation circuitry configured to:

determine, based on the shared visual data object, a plurality of protected data values, wherein each protected data value is associated with a protected data field and determining the plurality of protected data values comprises:

identifying one or more shared software applications, for each shared software application, determining an application-specific protected data value set based on a data protection template for the shared software application, determining the plurality of protected data values based on each application-specific protected data value set, and determining a data masking operation for each of the plurality of protected data values based on a corresponding protected data field and using the data protection template for the corresponding shared software application;

for each protected data value:

generate a masked representation by applying a corresponding data masking operation for the protected data field that is associated with the protected data value to the protected data value, wherein the data masking operation is at least one of (a) visually obscuring the protected data value or (b) replacing the protected data value with a randomly-generated data value, and determine, based on a layout data object for the shared visual data object, a spatial coordinate set for the protected data value;

generate a masked visual data object based on each masked representation and each spatial coordinate set; and cause the masked visual data object to be displayed using the audiovisual conference session.

12. The apparatus of claim 11, wherein identifying the one or more shared software applications comprises:

determining the one or more shared user interfaces associated with the shared visual data object; and for each shared user interface, determining, based on the shared user interface, a respective shared software application of the one or more shared software applications.

13. The apparatus of claim 12, wherein the one or more shared user interfaces are determined based on a content layout data object.

14. The apparatus of claim 13, wherein the content layout data object is generated using one or more optical character recognitions that are performed on the shared visual data object.

15. The apparatus of claim 12, wherein determining the respective shared software application for a first shared user interface of the one or more shared user interfaces comprises:

determining an image representation for the first shared user interface, and determining the respective shared software application based on the image representation and using an image classification machine learning model.

16. The apparatus of claim 11, wherein the masked representation for a respective protected data value comprises a mask user interface element.

17. A computer program product for protected display of a shared visual data object associated with an audiovisual conference session, the computer program product comprising at least one non-transitory computer-readable storage medium storing software instructions that, when executed, cause an apparatus to:

receive the shared visual data object, wherein the shared visual data object comprises visual data associated with one or more shared user interfaces;

determine, based on the shared visual data object, a plurality of protected data values, wherein each protected data value is associated with a protected data field and determining the plurality of protected data values comprises:

identifying one or more shared software applications, for each shared software application, determining an application-specific protected data value set based on a data protection template for the shared software application, determining the plurality of protected data values based on each application-specific protected data value set, and determining a data masking operation for each of the plurality of protected data values based on a corresponding protected data field and using the data protection template for the corresponding shared software application;

for each protected data value:

generate a masked representation by applying a corresponding data masking operation for the protected data field that is associated with the protected data value to the protected data value, wherein the data masking operation is at least one of (a) visually obscuring the protected data value or (b) replacing the protected data value with a randomly-generated data value, and determine, based on a layout data object for the shared visual data object, a spatial coordinate set for the protected data value;

generate a masked visual data object based on each masked representation and each spatial coordinate set; and cause the masked visual data object to be displayed using the audiovisual conference session.

18. The method of claim 1, wherein determining the data masking operation for each of the plurality of protected data values further comprises:

determining, using the user interface generation circuitry, a first data masking operation for a first protected data value associated with a first protected data field;

determining, using the user interface generation circuitry, a second data masking operation for a second protected data value associated with a second protected data field, wherein the second data masking operation is different than the first data masking operation.

19. The apparatus of claim 11, wherein the masked representation for a respective protected data value comprises a masked data value that is different from the respective protected data value.

20. The apparatus of claim 11, wherein the randomly-generated data value is determined based on a probability distribution whose parameters are determined based on the respective protected data value.

* * * * *